US012736746B2

(12) United States Patent
Meade et al.

(10) Patent No.: US 12,736,746 B2
(45) Date of Patent: Sep. 15, 2026

(54) PHOTONIC FANOUT

(71) Applicant: Ayar Labs, Inc., Emeryville, CA (US)

(72) Inventors: Roy Edward Meade, Lafayette, CA (US); Vladimir Stojanovic, Berkeley, CA (US); Mark Wade, Berkeley, CA (US)

(73) Assignee: Ayar Labs, Inc., San Jose, CA (US)

( * ) Notice: Subject to any disclaimer, the term of this patent is extended or adjusted under 35 U.S.C. 154(b) by 51 days.

(21) Appl. No.: 16/688,904

(22) Filed: Nov. 19, 2019

(65) Prior Publication Data

US 2020/0158950 A1 May 21, 2020

Related U.S. Application Data

(60) Provisional application No. 62/769,522, filed on Nov. 19, 2018.

(51) Int. Cl.
*G02B 6/12* (2006.01)

(52) U.S. Cl.
CPC .................... *G02B 6/12004* (2013.01); *G02B 2006/12142* (2013.01); *G02B 2006/12147* (2013.01); *G02B 2006/1215* (2013.01)

(58) Field of Classification Search
None
See application file for complete search history.

(56) References Cited

U.S. PATENT DOCUMENTS

| | | | | |
|---|---|---|---|---|
| 6,356,692 B1 * | 3/2002 | Ido | G02B 6/12007 | 385/129 |
| 6,456,766 B1 * | 9/2002 | Shaw | G02B 6/423 | 385/47 |
| 8,532,157 B2 * | 9/2013 | Cole | H01S 5/02234 | 372/92 |
| 9,606,308 B2 * | 3/2017 | Barwicz | G02B 6/4232 | |
| 9,698,564 B1 * | 7/2017 | Shubin | H01S 5/026 | |
| 2006/0002443 A1 * | 1/2006 | Farber | H01S 5/141 | 372/50.1 |

(Continued)

OTHER PUBLICATIONS

Sacher, Wesley D., et al. "Polarization rotator-splitters and controllers in a Si 3 N 4-on-SOI integrated photonics platform." Optics express 22.9 (2014): 11167-11174.

(Continued)

*Primary Examiner* — Chris H Chu
(74) *Attorney, Agent, or Firm* — Penilla IP, APC

(57) ABSTRACT

A photonic fanout die has a planar structure that has a top surface, a bottom surface, and outer side surfaces extending between the top surface and the bottom surface around an outer perimeter of the planar structure. The planar structure includes an opening formed within the outer perimeter. The opening has side surfaces that extend from the top surface to the bottom surface. The photonic fanout die also includes a plurality of optical waveguides formed within the planar structure to extend from a side surface of the opening to an outer side surface of the planar structure. The plurality of optical waveguides is configured such that a spacing between adjacent optical waveguides at the outer side surface of the planar structure is greater than a spacing between adjacent optical waveguides at the side surface of the opening.

27 Claims, 14 Drawing Sheets

(View I-I)

(56) References Cited

U.S. PATENT DOCUMENTS

| | | | | |
|---|---|---|---|---|
| 2014/0319656 | A1* | 10/2014 | Marchena | H01S 5/02326 438/106 |
| 2014/0348461 | A1* | 11/2014 | Budd | G02B 6/125 156/60 |
| 2016/0291265 | A1* | 10/2016 | Kinghorn | G02B 6/4238 |
| 2016/0291269 | A1* | 10/2016 | Klein | G02B 6/4251 |
| 2017/0160501 | A1* | 6/2017 | Schultz | G02B 6/4245 |
| 2020/0220329 | A1* | 7/2020 | Siriani | H01S 5/021 |
| 2021/0215897 | A1* | 7/2021 | Epitaux | G02B 6/4257 |

OTHER PUBLICATIONS

Della Corte, Francesco Giuseppe, and Sandro Rao. "Use of amorphous silicon for active photonic devices." IEEE Transactions on Electron Devices 60.5 (2013): 1495-1505.

Bucio, Thalia Dominguez, et al. "Material and optical properties of low-temperature NH3-free PECVD SiN x layers for photonic applications." Journal of Physics D: Applied Physics 50.2 (2016): 025106.

Snyder, Bradley et al., "Broadband, Polarization-Insensitive Lensed Edge Couplers for Silicon Photonics," 2018 IEEE 68th Electronic Components and Technology Conference (ECTC), May 29, 2018.

Ma, Shuying et al., "Embedded Silicon Fan-Out (eSiFO): A Promising Wafer Level Packaging Technology for Multi-Chip and 3D System Integration," 2018 IEEE 68th Electronic Components and Technology Conference (ECTC), May 29, 2018.

Chaware, Raghunandan et al., "Assembly and Reliability Challenges in 3D Integration of 28nm FPGA Die on a Large High Density 65nm Passive Interposer," Proceedings of IEEE Electronic Components and Technology Conference (ECTC), pp. 279-283, May 29, 2012.

* cited by examiner (View B-B)

(View C-C)

(View D-D)

(View E-E)

(View F-F)

(View I-I)

(View J-J)

(View K-K)

(View L-L)

(View M-M)

(View N-N)

(View O-O)

(View P-P)

(View O-O)

(View P-P)

PHOTONIC FANOUT

CLAIM OF PRIORITY

This application claims priority under 35 U.S.C. 119(e) to U.S. Provisional Patent Application No. 62/769,522, filed Nov. 19, 2018, the disclosure of which is incorporated herein by reference in its entirety for all purposes.

BACKGROUND

Optical data communication systems operate by modulating laser light to encode digital data patterns. The modulated laser light is transmitted through an optical data network from a sending node to a receiving node. The modulated laser light having arrived at the receiving node is de-modulated to obtain the original digital data patterns. Therefore, implementation and operation of optical data communication systems is dependent upon having reliable and efficient mechanisms for transmitting laser light and detecting laser light at different nodes within the optical data network. In this regard, it can be necessary to transmit laser light from an optical fiber to a chip, and vice-versa, which requires proper positioning and securing of the optical fiber relative to the chip. Current photonic and silicon photonic packages rely upon attachment of optical fiber(s) directly to the chip. However, it is challenging to make optical fibers and connectors solder reflow compatible. This dramatically limits the efficacy of photonic and silicon photonic packages. It is within this context that the present invention arises.

SUMMARY

In an example embodiment, a photonic fanout die is disclosed. The photonic fanout die includes a planar structure having a top surface, a bottom surface, and outer side surfaces extending between the top surface and the bottom surface around an outer perimeter of the planar structure. The planar structure includes an opening formed within the outer perimeter. The opening has side surfaces that extend from the top surface to the bottom surface. The photonic fanout die also includes a plurality of optical waveguides formed within the planar structure to extend from a side surface of the opening to an outer side surface of the planar structure. The plurality of optical waveguides is configured such that a spacing between adjacent optical waveguides at the outer side surface of the planar structure is greater than a spacing between adjacent optical waveguides at the side surface of the opening.

In an example embodiment, a photonic package assembly is disclosed. The photonic package assembly includes a microelectronic package substrate having a top surface and a bottom surface. The photonic package assembly also includes a photonic fanout die having a top surface and a bottom surface. The photonic fanout die is disposed on the microelectronic package substrate such that the bottom surface of the photonic fanout die faces toward the top surface of the microelectronic package substrate. The photonic fanout die has outer side surfaces extending between the top and bottom surfaces of the photonic fanout die around an outer perimeter of the photonic fanout die. The photonic fanout die includes an opening formed within the outer perimeter. The opening has side surfaces that extend between the top and bottom surfaces of the photonic fanout die. The photonic fanout die includes a plurality of optical waveguides formed to extend from a side surface of the opening to an outer side surface of the photonic fanout die. The plurality of optical waveguides is configured such that a spacing between adjacent optical waveguides at the outer side surface of the photonic fanout die is greater than a spacing between adjacent optical waveguides at the side surface of the opening within the photonic fanout die. The photonic package assembly also includes a photonic die positioned within the opening of the photonic fanout die, such that a plurality of optical waveguides within the photonic die optically align with the plurality of optical waveguides within the photonic fanout die at the side surface of the opening within the photonic fanout die. The photonic package assembly also includes an integrated circuit die positioned to electrically interface with the photonic die.

DETAILED DESCRIPTION

In the following description, numerous specific details are set forth in order to provide an understanding of the present invention. It will be apparent, however, to one skilled in the art that the present invention may be practiced without some or all of these specific details. In other instances, well known process operations have not been described in detail in order not to unnecessarily obscure the present invention.

Figure 1A:
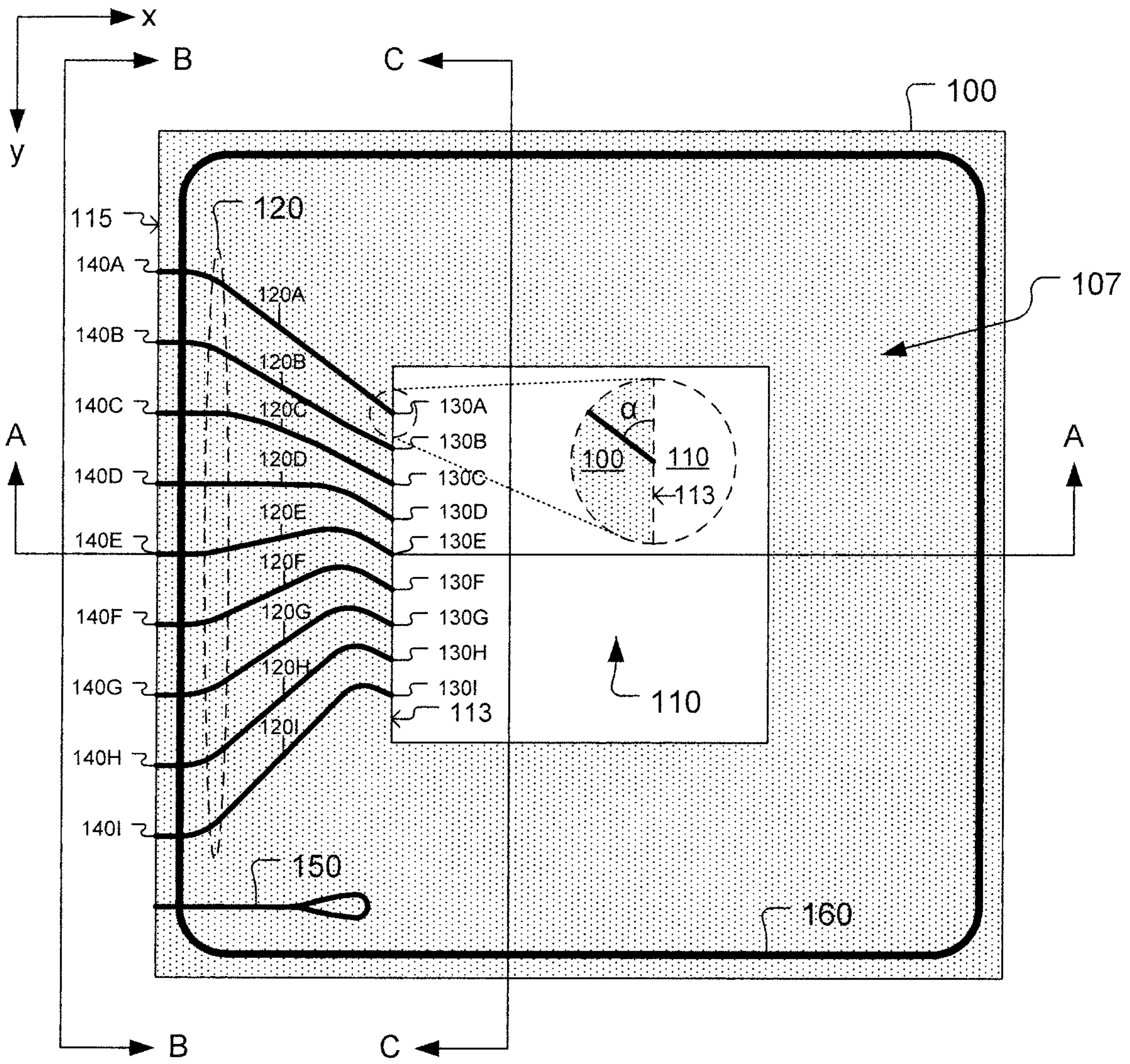
FIG. 1A shows a bottom view of a photonic fanout die, in accordance with some embodiments.
Figure 1B:
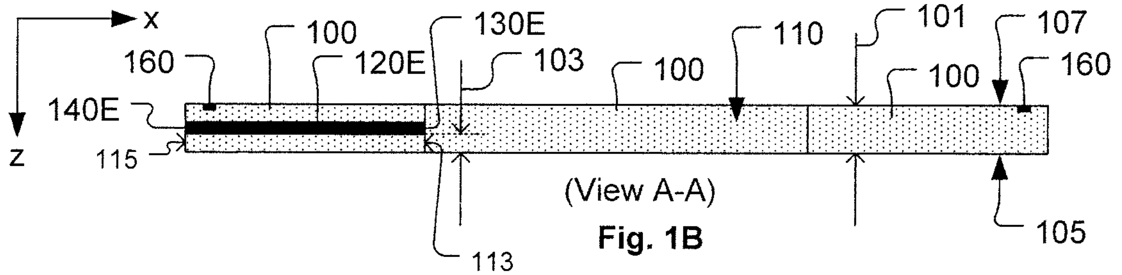
FIG. 1B shows a vertical cross-section view through the photonic fanout die, referenced as View A-A in FIG. 1A, in accordance with some embodiments.
Figure 1C:
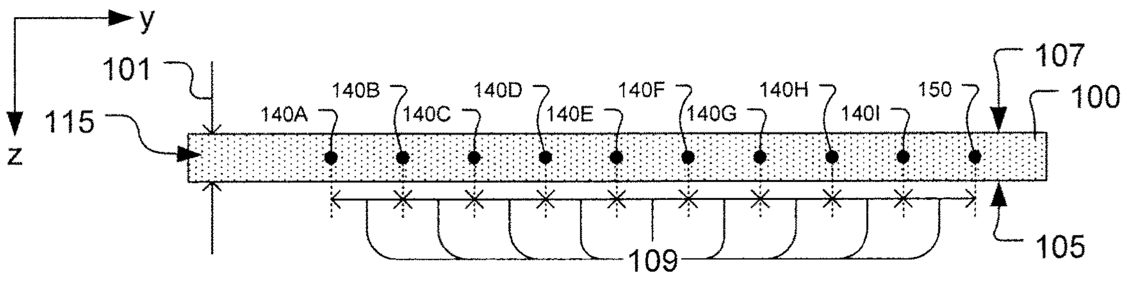
FIG. 1C shows a vertical cross-section view through the photonic fanout die, referenced as View B-B in FIG. 1A, in accordance with some embodiments.
Figure 1D:
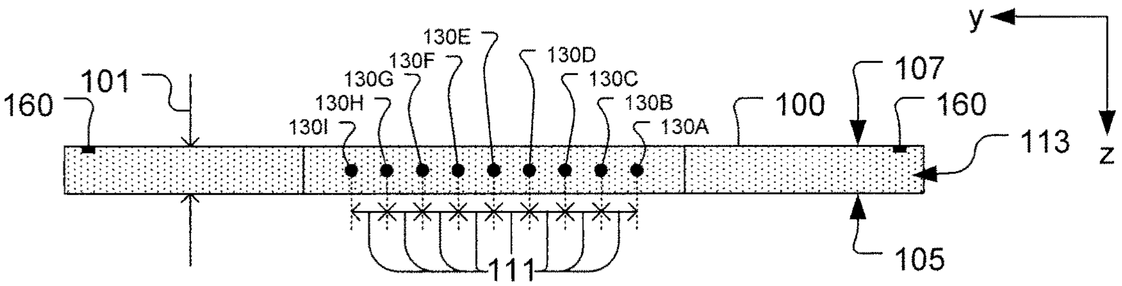
FIG. 1D shows a vertical cross-section view through the photonic fanout die, referenced as View C-C in FIG. 1A, in accordance with some embodiments.

In silicon photonics, it is necessary to couple optical waveguides to photonic die/chips so that light can be transmitted from the optical waveguides into the photonic die/chips and vice-versa. FIG. 1A shows a bottom view of a photonic fanout die 100, in accordance with some embodiments. FIG. 1B shows a vertical cross-section view through the photonic fanout die 100, referenced as View A-A in FIG. 1A, in accordance with some embodiments. FIG. 1C shows a vertical cross-section view through the photonic fanout die 100, referenced as View B-B in FIG. 1A, in accordance with some embodiments. FIG. 1D shows a vertical cross-section view through the photonic fanout die 100, referenced as View C-C in FIG. 1A, in accordance with some embodiments.

In various embodiments, the photonic fanout die 100 is a planar structure configured as a silicon interposer, a glass interposer, a portion of a semiconductor wafer, or a portion of a panel, among other configurations. In some embodiments, the photonic fanout die 100 includes both photonic devices and electronic devices. In some embodiments, the photonic fanout die 100 includes just photonic devices. Examples of the photonic devices that can be formed within the photonic fanout die 100 include, but are not limited to, polarization splitter rotators, optical spot size converters, star optical couplers, arrayed optical waveguides (AWGs), optical modulators, photodetectors, optical phase shifters, among essentially any other type of photonic device. Also, in some embodiments, the photonic fanout die 100 includes metal routing and/or through-silicon-vias and/or through-glass-vias to enable electrical connection of components that interface with the photonic fanout die 100.

In various embodiments, the example photonic fanout die 100 has a rectangular (or square) outer perimeter. However, in some embodiments, the photonic fanout die 100 is configured to have an outer perimeter that is neither square or rectangular. For example, in some embodiments, the photonic fanout die 100 has an outer perimeter that is polygonal. Also, the photonic fanout die 100 has a top surface 105 and a bottom surface 107. In some embodiments, the photonic fanout die 100 has a substantially uniform thickness 101 as measured perpendicularly between the top surface 105 and the bottom surface 107. In some embodiments, the thickness 101 of the photonic fanout die 100 is within a range extending from about 100 micrometers to about 150 micrometers. However, in other embodiments, the thickness 101 of the photonic fanout die 100 is either greater than about 50 micrometers or less than about 780 micrometers. Also, in various embodiments, the thickness 101 of the photonic fanout die 100 can be controlled very accurately, such as with a tolerance of about +/−5 micrometers.

The photonic fanout die 100 includes an opening 110, which corresponds to a region of the photonic fanout die 100 that is removed. In some embodiments, such as shown in the example of FIG. 1A, a perimeter of the opening 110 has a square or rectangular shape. However, in some embodiments, the shape of the perimeter of the opening 110 is neither square nor rectangular. For example, in some embodiments, the perimeter of the opening 110 has a polygonal shape. Also, in some embodiments, such as shown in the example of FIG. 1A, the opening 110 is substantially centered within the photonic fanout die 100. However, in other embodiments, the opening 110 can be formed closer to a particular side or a particular corner of the photonic fanout die 100. Also, in various embodiments, the opening 110 can be sized and shaped as needed to accommodate insertion of one or more other devices within the opening 110, where the other devices can include one or more of a photonic device, an electrical device, an opto-electric device, a chip, and a die.

The photonic fanout die 100 also includes a number of optical waveguides 120A-120I, collectively referred to as optical waveguides 120. It should be understood that in various embodiments, the photonic fanout die 100 can include either more or less optical waveguides than the optical waveguides 120A-120I shown by way of example. In various embodiments, the optical waveguides 120A-120I are collectively configured to provide a fanout function, such that a lateral spacing 109 as measured parallel to the x-y plane between ends of adjacent ones of the optical waveguides 120A-120I at the outer periphery of the photonic fanout die 100 is greater than a lateral spacing 111 as measured parallel to the x-y plane between ends of adjacent ones of the optical waveguides 120A-120I at opening 110. Also, in various embodiments, one or more of the optical waveguides 120 is/are configured to have their light propagation axis approach the edge of the opening 110 at a non-perpendicular angle $\alpha$ in order to reduce optical reflection at the edge 113 of the opening 110. In some embodiments, the angle α at which the light propagation axis of any given one of the optical waveguides 120 approaches the edge 113 of the opening 110 is within a range extending from about 4 degrees to about 8 degrees. It should be understood, however, that in other embodiments the angle α at which the light propagation axis of any given one of the optical waveguides 120 approaches the edge 113 of the opening 110 is either less than about 12 degrees or greater than about 0 degree. The optical waveguides 120 are positioned at a prescribed depth within the photonic fanout die 100, such that a distance 103 exists between the top of the optical waveguides 120 and the top surface 105 of the photonic fanout die 100, as shown in the vertical cross-section of FIG. 1B which extends through the optical waveguide 120E. In various embodiments, the distance 103 between the top surface 105 of the photonic fanout die 100 and the optical waveguides 120 is within a range extending from about 10 micrometers to about 20 micrometers. The distance 103 between the top surface 105 of the photonic fanout die 100 and the optical waveguides 120 is a known parameter and can be precisely controlled, such as with a tolerance of about +/−5 micrometers.

In some embodiments, any given one or more of the optical waveguides 120 is/are configured to have a rectangular vertical cross-section. In some embodiments, any given one or more of the optical waveguides 120 is/are configured to have a polygonal vertical cross-section. In some embodiments, any given one or more of the optical waveguides 120 is/are configured to have a vertical cross-section that includes one or more non-linear sides. In various embodiments, the optical waveguides 120 are formed of one or more material(s) through which light can propagate in a guided manner. For example, in some embodiments the optical waveguides 120 are formed of silicon, or silicon nitride, or combinations of silicon and silicon nitride, among other materials. In some embodiments, the vertical cross-section of each of the optical waveguides 120 has a lateral (horizontal) dimension as measured parallel to the x-y plane within a range extending from about 80 nanometers to about 300 nanometers. It should be understood, however, that in other embodiments the optical waveguides 120 can have a lateral dimension as measured parallel to the x-y plane that is either less than about 2 micrometers or greater than about 200 nanometers. In some embodiments, the vertical cross-section of each of the optical waveguides 120 has a thickness (vertical) dimension as measured in the z-direction within a range extending from about 100 nanometers to about 300 nanometers. It should be understood, however, that in other embodiments the optical waveguides 120 can have a thickness dimension as measured in the z-direction that is either less than about 400 nanometers or greater than about 80 nanometers.

In some embodiments, spot size converters 130A-130I are formed at the locations where the optical waveguides 120A-120I, respectively, interface with the edge 113 of the opening 110. It should be understood, however, that in some embodiments, the spot size converters 130A-130I are not present at the locations where the optical waveguides 120A-120I, respectively, interface with the edge 113 of the opening 110. The spot size of a given one of the optical waveguides 120A-120I is equivalent to the mode field diameter of the given one of the optical waveguides 120A-120I. Each of the spot size converters 130A-130I is a device, optical waveguide geometry, or structure that modifies the corresponding optical waveguide 120A-120I to expand, or alternatively contract, the mode field diameter. In some embodiments, one or more of the spot size converters 130A-130I and/or the corresponding spot size converter 230A-230I is/are configured to alter the mode field diameter adiabatically (i.e., in a lossless or effectively lossless manner). In other embodiments, one or more of the spot size converters 130A-130I and the corresponding spot size converter 230A-230I are collectively configured such that at the intersection of the corresponding optical waveguide 120A-120I and the corresponding optical waveguide 210A-210I the two respective mode field diameters (i.e., spot sizes) are substantially equivalent. In some embodiments, any of the spot size converters 130A-130I can be configured to incorporate an integrated taper or a lensed edge coupler, such as discussed in "Broadband, Polarization-Insensitive Lensed Edge Couplers for Silicon Photonics," by Snyder, Bradley et al., 2018 IEEE 68th Electronic Components and Technology Conference (ECTC), IEEE, 2018, which is incorporated herein by reference. In some embodiments, a light propagation axis of any given one or more of the spot size converters 130A-130I is oriented in a plane parallel to the x-y plane at a non-perpendicular angle relative to the edge 113 of the opening 110. For example, in some embodiments, any given one or more of the spot size converters 130A-130I can have its light propagation axis oriented in a plane parallel to the x-y plane at substantially the same angle α at which the corresponding one of the optical waveguides 120 approaches the edge 113 of the opening 110. However, in some embodiments, any given one or more of the spot size converters 130A-130I can have its light propagation axis oriented in a plane parallel to the x-y plane at an angle that is not the same as the angle α at which the corresponding one of the optical waveguides 120 approaches the edge 113 of the opening 110. In some embodiments, the spot size converters 130A-130I are formed using a lithographic fabrication process which provides for positioning and orienting of the spot size converters 130A-130I as needed. It should be understood that in various embodiments the positioning and orienting of the spot size converters 130A-130I is engineered to reduce light reflections at the interface between the optical waveguides 120A-120I, respectively, and the edge 113 of the opening 110.

In some embodiments, spot size converters 140A-140I are formed at the locations where the optical waveguides 120A-120I, respectively, interface with the outer edge 115 of the photonic fanout die 100. It should be understood, however, that in some embodiments, the spot size converters 140A-140I are not used. Therefore, in some embodiments, the spot size converters 140A-140I are not present at the locations where the optical waveguides 120A-120I, respectively, interface with the outer edge 115 of the photonic fanout die 100. In some embodiments, the spot size converters 140A-140I are engineered to substantially match a spot size of optical fibers or other optical waveguides that are to optically couple with the optical waveguides 120A-120I, respectively, within the photonic fanout die 100. In some embodiments, any of the spot size converters 140A-140I can be configured to incorporate an integrated taper or a lensed edge coupler, such as discussed above with regard to the spot size converters 130A-130I. In some embodiments, a light propagation axis of any given one or more of the spot size converters 140A-140I is oriented in a plane parallel to the x-y plane at a non-perpendicular angle relative to the edge 115 of the photonic fanout die 100 in order to reduce light reflections at the edge 115 of the photonic fanout die 100. However, in some embodiments, the light propagation axis of any given one or more of the spot size converters 140A-140I is oriented in a plane parallel to the x-y plane to be substantially perpendicular to the edge 115 of the photonic fanout die 100. In some embodiments, the spot size converters 140A-140I are formed using a lithographic fabrication process which provides for positioning and orienting of the spot size converters 140A-140I as needed. It should be understood that in various embodiments the positioning and orienting of the spot size converters 140A-140I is engineered to reduce light reflections at the interface between the optical waveguides 120A-120I, respectively, and a corresponding optical fiber and/or optical waveguide that interfaces with the edge 115 of the photonic fanout die 100. In some embodiments, the edge(s) of the photonic fanout die 100 that have optical waveguide interfaces is/are polished. For example, in some embodiments, the outer edge 115 of the photonic fanout die 100 where the spot size converters 140A-140I are located is polished.

In some embodiments, the photonic fanout die 100 includes a test and characterization optical waveguide 150. During testing and analysis of the photonic fanout die 100, the quality of the photonic fanout die 100 can be evaluated by measuring performance of light transmission through the test and characterization optical waveguide 150. In some embodiments, the test and characterization optical waveguide 150 includes a reflector. For example, in some embodiments, a Bragg grating or other type of reflector can be formed at the end of the test and characterization optical waveguide 150. Also, in some embodiments, the test and characterization optical waveguide 150 can be configured to loop back to another optical waveguide for testing and analysis. In various embodiments, the test and characterization optical waveguide 150 can be configured and fabricated in a manner similar to the optical waveguides 120.

Additionally, in some embodiments, the photonic fanout die 100 includes a metal layer 160 that is configured to connect with another planar component that will interface with the photonic fanout die 100. In some embodiments, such as shown in FIG. 1A, the metal layer 160 is configured to extend around the photonic fanout die 100 near an outer peripheral edge of the photonic fanout die 100. In some embodiments, the metal layer 160 is configured for soldering to another planar component. In some embodiments, the metal layer 160 is configured to have a rectangular vertical cross-section. In some embodiments, the metal layer 160 is configured to have a polygonal vertical cross-section. In some embodiment, the metal layer 160 is configured to have a vertical cross-section that includes one or more non-linear sides. In some embodiments, the vertical cross-section of the metal layer 160 has a lateral (horizontal) dimension as measured in a plane parallel to the x-y plane within a range extending from about 2 micrometers to about 10 micrometers. It should be understood, however, that in other embodiments the vertical cross-section of the metal layer 160 can have a lateral dimension as measured in a plane parallel to the x-y plane that is either less than about 20 micrometers or greater than about 1 micrometer. In some embodiments, the vertical cross-section of the metal layer 160 has a thickness (vertical) dimension as measured in the z-direction within a range extending from about 1 micrometer to about 12 micrometers. It should be understood, however, that in other embodiments the vertical cross-section of the metal layer 160 can have a thickness dimension as measured in the z-direction that is either less than about 15 micrometers or greater than about 500 nanometers. In various embodiments, the metal layer 160 can be formed of various materials, such as copper, nickel, titanium, or aluminum, among others. It should also be understood that in some embodiments the photonic fanout die 100 can be formed without the metal layer 160.

Figure 2A:
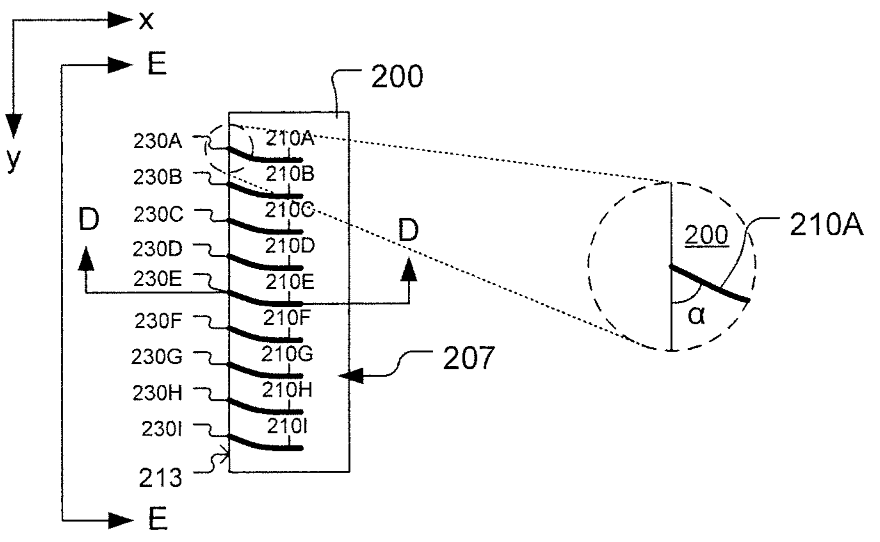
FIG. 2A shows a bottom view of a photonic die, in accordance with some embodiments.
Figure 2B:
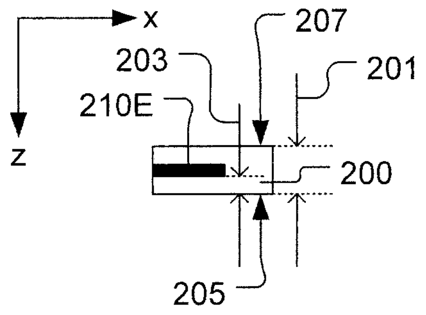
FIG. 2B shows a vertical cross-section view through the photonic die, referenced as View D-D in FIG. 2A, in accordance with some embodiments.
Figure 2C:
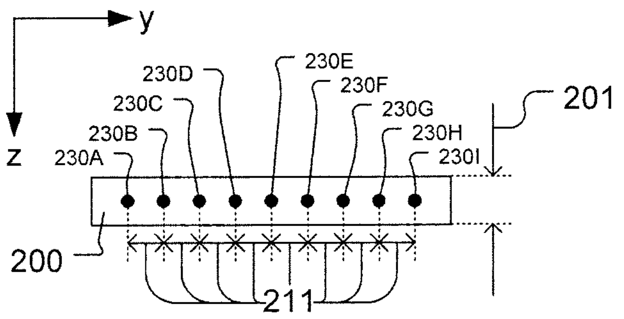
FIG. 2C shows a side view of the photonic die, referenced as View E-E in FIG. 2A, in accordance with some embodiments.

FIG. 2A shows a bottom view of a photonic die 200, in accordance with some embodiments. FIG. 2B shows a vertical cross-section view through the photonic die 200, referenced as View D-D in FIG. 2A, in accordance with some embodiments. FIG. 2C shows a side view of the photonic die 200, referenced as View E-E in FIG. 2A, in accordance with some embodiments. In various embodiments, the photonic die 200 is a silicon photonic die or a glass photonic die. However, in other embodiments, the photonic die 200 is formed of a material other than silicon or glass. In some embodiments, the photonic die 200 includes both photonic devices and electronic devices. Examples of the photonic devices that can be formed within the photonic die 200 include, but are not limited to, polarization splitter rotators, optical spot size converters, star optical couplers, arrayed optical waveguides (AWGs), optical modulators, photodetectors, optical phase shifters, among essentially any other type of photonic device. Also, in some embodiments, the photonic die 200 includes metal routing and/or through-silicon-vias and/or through-glass-vias to enable electrical connection of components that interface with the photonic die 200.

In various embodiments, the example photonic die 200 has a rectangular outer perimeter within a plane parallel to the x-y plane. However, in some embodiments, the photonic die 200 is configured to have an outer perimeter that is non-rectangular within a plane parallel to the x-y plane. For example, in some embodiments, the photonic die 200 has an outer perimeter that is polygonal. Also, the photonic die 200 has a top surface 205 and a bottom surface 207. In some embodiments, the photonic die 200 has a substantially uniform thickness 201 as measured perpendicularly between the top surface 205 and the bottom surface 207. In some embodiments, the thickness 201 of the photonic die 200 is within a range extending from about 100 micrometers to about 350 micrometers. However, in other embodiments, the thickness 201 of the photonic die 200 is either greater than 50 micrometers or less than 780 micrometers. Also, in various embodiments, the thickness 201 of the photonic die 200 can be controlled very accurately, such as with a tolerance of about +/−5 micrometers. In some embodiments, the thickness 201 of the photonic die 200 is substantially the same as the thickness 101 of the photonic fanout die 100.

The photonic die 200 also includes a number of optical waveguides 210A-210I, collectively referred to as optical waveguides 210. It should be understood that in various embodiments, the photonic die 200 can include either more or less optical waveguides than the optical waveguides 210A-210I shown by way of example. In various embodiments, each of the optical waveguides 210A-210I is configured to optically couple to one or more photonic circuits within the photonic die 200. Each of the optical waveguides 210A-210I is configured to extend to an edge 213 of the photonic die 200. Also, in various embodiments, one or more of the optical waveguides 210 is/are configured to have their light propagation axis approach the edge 213 of the photonic die 200 at the non-perpendicular angle $\alpha$. In some embodiments, the angle $\alpha$ of the light propagation axis of the optical waveguides 210A-210I relative to the edge 213 of the photonic die 200 is configured to be optically equivalent to the angle of the light propagation axis of the spot size converters 130A-130I, respectively, of the photonic fanout die 100 relative to the edge 113 of the opening 110 of the photonic fanout die 100, as shown in FIG. 1A. In some embodiments, the physical angle of the optical waveguides 210A-210I relative to the edge 213 of the photonic die 200 can be different from the physical angle of the spot size converters 130A-130I, respectively, of the photonic fanout die 100 relative to the edge 113 of the opening 110 of the photonic fanout die 100, so long as the optical angle of the spot size converters 130A-130I relative to the edge 113 of the opening 110 is about the same as the optical angle of the optical waveguides 210A-210I, respectively, relative to the edge 213 of the photonic die 200. In some embodiments, the angle α at which the light propagation axis of any given one of the optical waveguides 210 approaches the edge 213 of the photonic die 200 is within a range extending from about 6 degrees to about 8 degrees. It should be understood, however, that in other embodiments the angle α at which the light propagation axis of any given one of the optical waveguides 210 approaches the edge 213 of the photonic die 200 is either less than about 12 degrees or greater than about 0 degree.

In various embodiments, a lateral spacing 211 between adjacent ones of the optical waveguides 210A-210I at the edge 213 of the photonic die 200 is substantially the same as the lateral spacing 111 between ends of adjacent ones of the optical waveguides 120A-120I at the edge 113 of the opening 110 of the photonic fanout die 100. The optical waveguides 210 are positioned at a prescribed depth within the photonic die 200, such that a distance 203 exists between the top of the optical waveguides 210 and the top surface 205 of the photonic die 200, as shown in the vertical cross-section of FIG. 2B which extends through the optical waveguide 210E. In some embodiments, the distance 203 is substantially the same as the distance 103. The distance 203 between the top surface 205 of the photonic die 200 and the optical waveguides 210 is a known parameter and can be precisely controlled, such as with a tolerance of about +/−5 micrometers.

In some embodiments, any given one or more of the optical waveguides 210 is/are configured to have a rectangular vertical cross-section. In some embodiment, any given one or more of the optical waveguides 210 is/are configured to have a polygonal vertical cross-section. In some embodiment, any given one or more of the optical waveguides 210 is/are configured to have a vertical cross-section that includes one or more non-linear sides. In various embodiments, the optical waveguides 210 are formed of one or more material(s) through which light can propagate in a guided manner. For example, in some embodiments the optical waveguides 210 are formed of silicon, silicon nitride, indium phosphide, among other materials. In some embodiments, the vertical cross-section of each of the optical waveguides 210 has a lateral (horizontal) dimension as measured parallel to the x-y plane within a range extending from about 250 nanometers to about 300 nanometers. It should be understood, however, that in other embodiments the optical waveguides 210 can have a lateral dimension as measured parallel to the x-y plane that is either less than about 2 micrometers or greater than about 200 nanometers. In some embodiments, the vertical cross-section of each of the optical waveguides 210 has a thickness (vertical) dimension as measured in the z-direction within a range extending from about 100 nanometers to about 280 nanometers. It should be understood, however, that in other embodiments the optical waveguides 210 can have a thickness dimension as measured in the z-direction that is either less than about 400 nanometers or greater than about 80 nanometers.

In some embodiments, spot size converters 230A-230I are formed at the locations where the optical waveguides 210A-210I, respectively, interface with the outer edge 213 of the photonic die 200. It should be understood, however, that in some embodiments, the spot size converters 230A-230I are not present at the locations where the optical waveguides 210A-210I, respectively, interface with the outer edge 213 of the photonic die 200. In some embodiments, the spot size converters 230A-230I are engineered to have a spot size that substantially matches a spot size of the spot size converters 130A-130I, respectively, within the photonic fanout die 100. In some embodiments, any of the spot size converters 230A-230I can be configured to incorporate an integrated taper or a lensed edge coupler, such as discussed above with regard to the spot size converters 130A-130I. In some embodiments, a light propagation axis of any given one or more of the spot size converters 230A-230I is oriented in a plane parallel to the x-y plane at a non-perpendicular angle relative to the edge 213 of the photonic die 200 in order to reduce light reflections at the edge 213 of the photonic die 200. However, in some embodiments, the light propagation axis of any given one or more of the spot size converters 230A-230I is oriented in a plane parallel to the x-y plane to be substantially perpendicular to the edge 213 of the photonic die 200. In some embodiments, the spot size converters 230A-230I are formed using a lithographic fabrication process which provides for positioning and orienting of the spot size converters 230A-230I as needed. It should be understood that in various embodiments the positioning and orienting of the spot size converters 230A-230I is engineered to optimize optical coupling of the optical waveguides 210A-210I with the optical waveguides 120A-120I, respectively, when the photonic die 200 is positioned within the opening 110 such that the edge 213 of the photonic die 200 is adjacent to the edge 113 of the photonic fanout die 100.

Figure 3A:
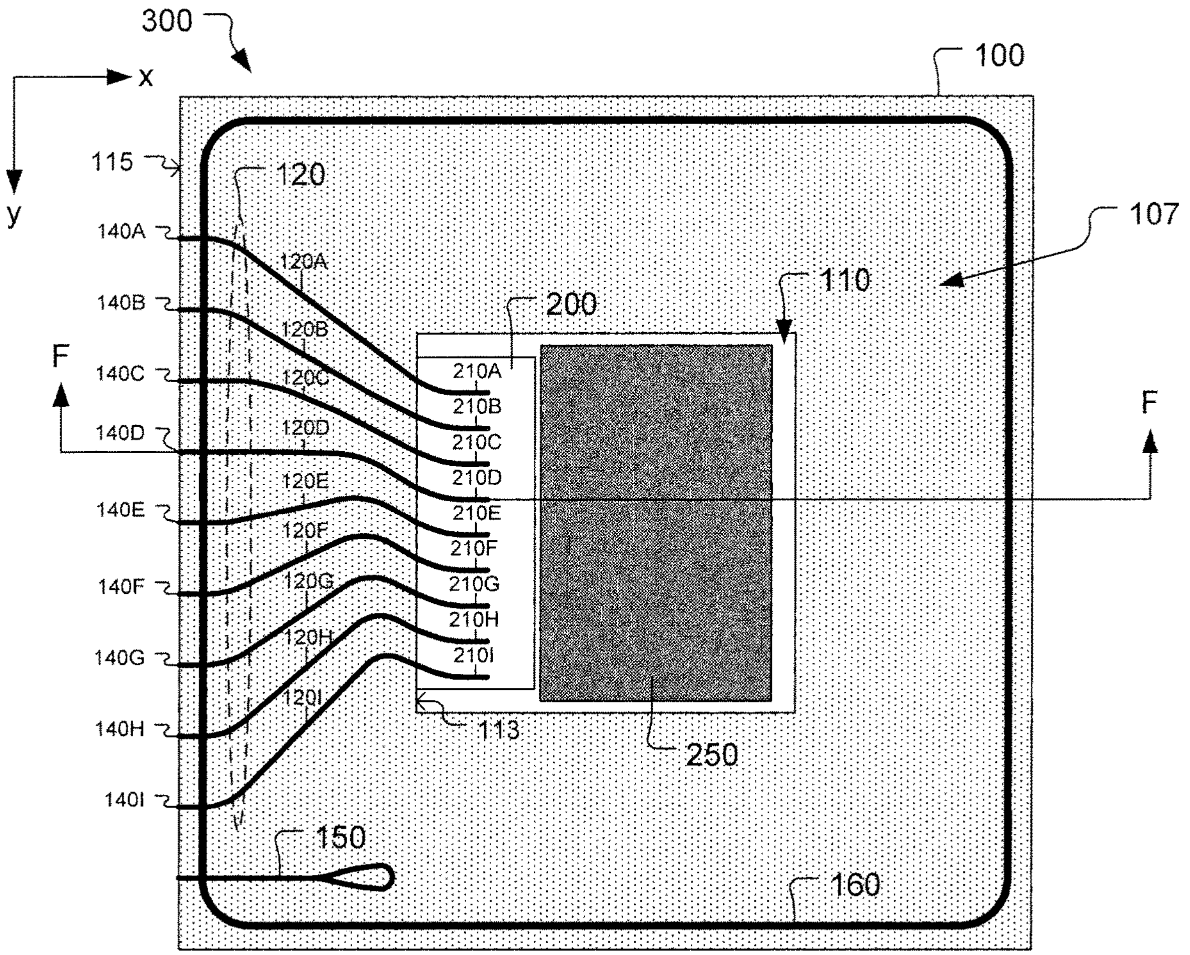
FIG. 3A shows a bottom view of a sub-assembly that includes the photonic die positioned within the opening of the photonic fanout die, in accordance with some embodiments.
Figure 3B:
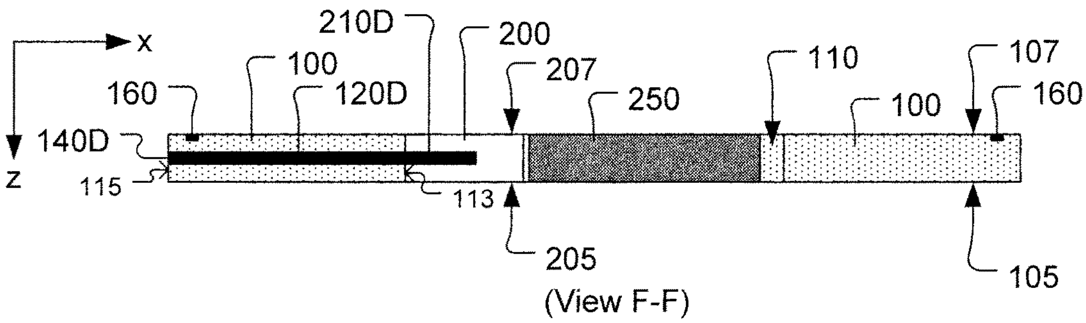
FIG. 3B shows a vertical cross-section view through the sub-assembly, referenced as View F-F in FIG. 3A, in accordance with some embodiments.

FIG. 3A shows a bottom view of a sub-assembly 300 that includes the photonic die 200 positioned within the opening 110 of the photonic fanout die 100, in accordance with some embodiments. FIG. 3B shows a vertical cross-section view through the sub-assembly 300, referenced as View F-F in FIG. 3A, in accordance with some embodiments. The sub-assembly 300 shows relative positions of electrical and optical components. For example, in the sub-assembly 300, the photonic die 200 is positioned within the opening 110 so that the optical waveguides 210A-210I within the photonic die 200 are optically aligned with the optical waveguides 120A-120I, respectively, within the photonic fanout die 100, and more specifically with the spot size converters 130A-130I, respectively, when present within the photonic fanout die 100. The example embodiment of FIG. 3A shows the one photonic die 200 positioned within the opening 110 and interfaced with the photonic fanout die 100. However, it should be understood that in other embodiments multiple photonic die (having configurations similar to the photonic die 200) can be positioned within the opening 110 to interface with the photonic fanout die 100. Also, it should be understood that in some embodiments the opening 110 is configured and positioned so that the photonic fanout die 100 does not surround the photonic die 200.

The sub-assembly 300 also includes another die 250 positioned within the opening 110 of the photonic fanout die 100. In various embodiments, the die 250 is a system-on-chip (SOC), a field programmable gate array (FPGA), a graphics processing unit (GPU), a central processing unit (CPU), or essentially any other type of electronic component. FIG. 3A shows an example embodiment in which one other die 250 is positioned within the opening 110 of the photonic fanout die 100. However, it should be understood that in other embodiments multiple other die 250 can be positioned within the opening 110 of the photonic fanout die 100, with the multiple die 250 and the opening 110 respectively sized to enable positioning of the multiple die 250 within the opening 110 in conjunction with the one or more photonic die 200. It should be understood that in various embodiments that include multiple photonic die 200 and/or multiple other die 250, each of the multiple photonic die 200 and multiple other die 250 can have a different size and shape, particularly within a plane parallel to the x-y plane. In this manner, the one or more photonic die 200 and the one or more other die 250 can be positioned within the opening 110 in a puzzle-like manner.

Figure 4A:
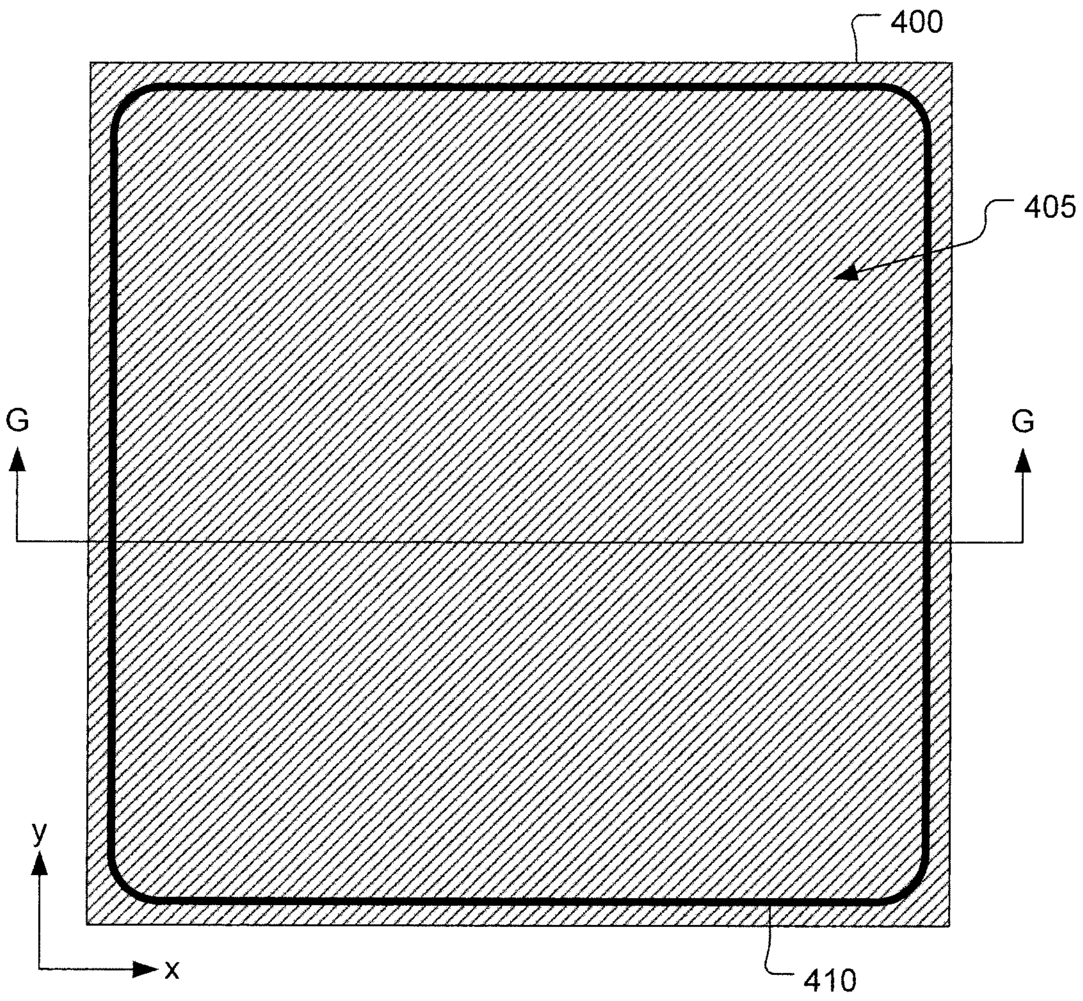
FIG. 4A shows a top view of a microelectronic package substrate, in accordance with some embodiments.
Figure 4B:
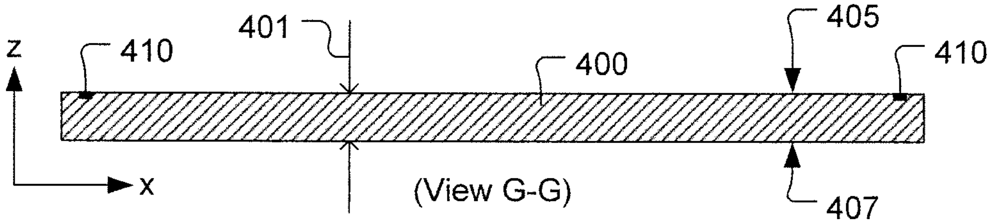
FIG. 4B shows a vertical cross-section view through the microelectronic package substrate, referenced as View G-G in FIG. 4A, in accordance with some embodiments.

FIG. 4A shows a top view of a microelectronic package substrate 400, in accordance with some embodiments. FIG. 4B shows a vertical cross-section view through the microelectronic package substrate 400, referenced as View G-G in FIG. 4A, in accordance with some embodiments. In some embodiments, the microelectronic package substrate 400 includes a silicon interposer (e.g., chip-on-wafer-on-substrate (CoWoS), or embedded silicon fan-out (eSiFo), among others), organic substrates, ceramic substrates, glass interposers, embedded multi-die interconnect bridge (EMIB), or any combination thereof.

In various embodiments, the microelectronic package substrate 400 has a rectangular (or square) outer perimeter. However, in some embodiments, the microelectronic package substrate 400 is configured to have an outer perimeter that is neither square or rectangular. For example, in some embodiments, the microelectronic package substrate 400 has an outer perimeter that is polygonal. In some embodiments, an outer perimeter of the microelectronic package substrate 400 has a size and shape within a plane parallel to the x-y plane that is substantially equivalent to the size and shape of the outer perimeter of the photonic fanout die 100 within a plane parallel to the x-y plane. In some embodiments, the outer perimeter of the microelectronic package substrate 400 has a size and shape within a plane parallel to the x-y plane that at least encompasses the size and shape of the outer perimeter of the photonic fanout die 100 within a plane parallel to the x-y plane.

The microelectronic package substrate 400 has a top surface 505 and a bottom surface 507. In some embodiments, the microelectronic package substrate 400 has a substantially uniform thickness 401 as measured perpendicularly between the top surface 405 and the bottom surface 407. In some embodiments, the thickness 401 of the microelectronic package substrate 400 is within a range extending from about 500 micrometers to about 1.5 millimeters. However, in other embodiments, the thickness 401 of the microelectronic package substrate 400 is either greater than 250 micrometers or less than 2 millimeters. Also, in various embodiments, the thickness 401 of the microelectronic package substrate 400 can be controlled very accurately, such as with a tolerance of about +/−50 micrometers.

In some embodiments, the microelectronic package substrate 400 includes a metal pad 410 that is configured to connect with another planar component that will interface with the microelectronic package substrate 400. In some embodiments, such as shown in FIG. 4A, the metal pad 410 is configured to extend around the microelectronic package substrate 400 near an outer peripheral edge of the microelectronic package substrate 400. In such embodiments, the metal pad 410 is characterized as having an annular shape. In some embodiments, the metal pad 410 is configured for soldering to another planar component, such as to the photonic fanout die 100.

In some embodiments, the metal pad 410 is configured to have a rectangular vertical cross-section. In some embodiment, the metal pad 410 is configured to have a polygonal vertical cross-section. In some embodiment, the metal pad 410 is configured to have a vertical cross-section that includes one or more non-linear sides. In some embodiments, the vertical cross-section of the metal pad 410 has a lateral (horizontal) dimension as measured parallel to the x-y plane within a range extending from about 50 micrometers to about 200 micrometers. It should be understood, however, that in other embodiments the vertical cross-section of the metal pad 410 can have a lateral dimension as measured parallel to the x-y plane that is either less than about 400 micrometers or greater than about 20 micrometers. In some embodiments, the vertical cross-section of the metal pad 410 has a thickness (vertical) dimension as measured in the z-direction within a range extending from about 1 micrometer to about 4 micrometers. It should be understood, however, that in other embodiments the vertical cross-section of the metal pad 410 can have a thickness dimension as measured in the z-direction that is either less than about 5 micrometers or greater than about 400 nanometers. In various embodiments, the metal pad 410 can be formed of various materials, such as copper, nickel, titanium, aluminum, electroless nickel immersion gold (ENIG), or electroless nickel electroless palladium immersion gold (ENEPIG), among others. It should also be understood that in some embodiments the microelectronic package substrate 400 can be formed without the metal pad 410.

Figure 5A:
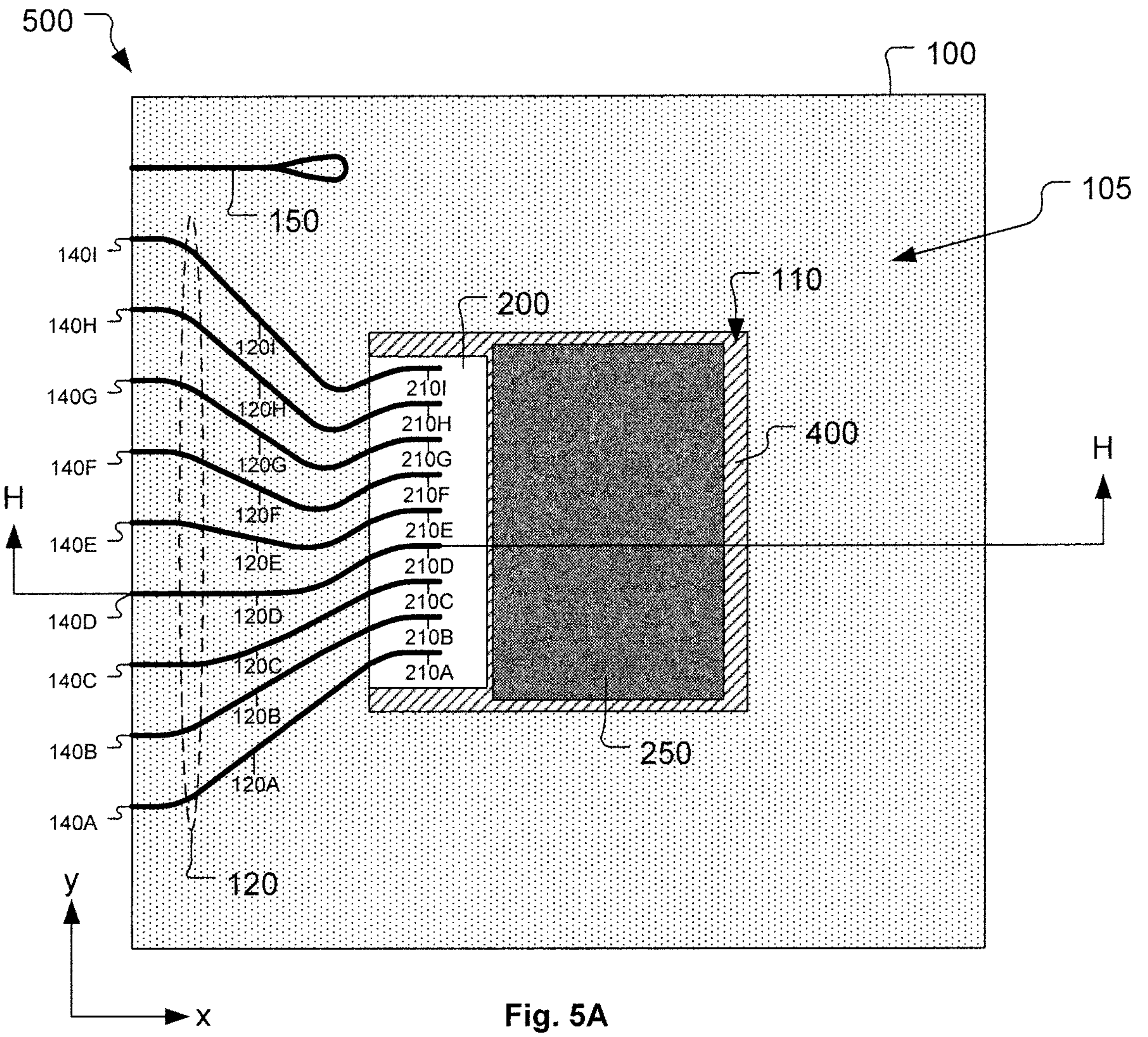
FIG. 5A shows a top view of a sub-assembly that includes the sub-assembly positioned on the microelectronic package substrate, in accordance with some embodiments.
Figure 5B:
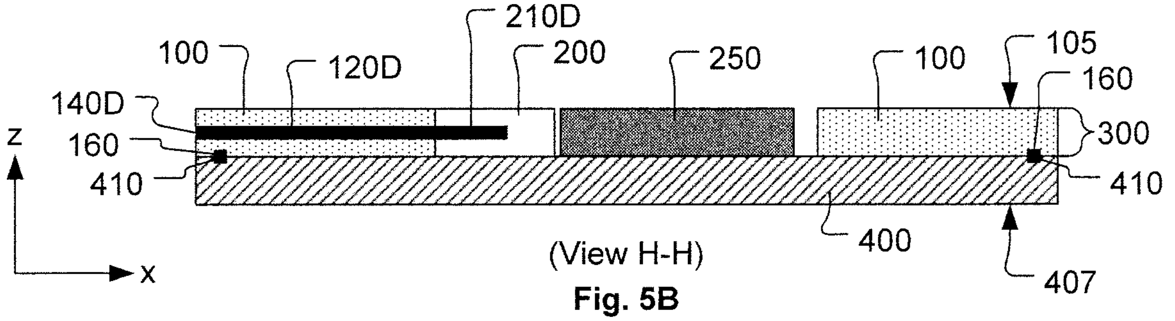
FIG. 5B shows a vertical cross-section view through the sub-assembly, referenced as View H-H in FIG. 5A, in accordance with some embodiments.

FIG. 5A shows a top view of a sub-assembly 500 that includes the sub-assembly 300 positioned on the microelectronic package substrate 400, in accordance with some embodiments. More specifically, in the sub-assembly 500, the sub-assembly 300 is positioned on the microelectronic package substrate 400 such that the bottom surface 107 of the photonic fanout die 100 is positioned facing toward the top surface 405 of the microelectronic package substrate 400. FIG. 5B shows a vertical cross-section view through the sub-assembly 500, referenced as View H-H in FIG. 5A, in accordance with some embodiments. In some embodiments, the metal layer 160 of the photonic fanout die 100 and the metal pad 410 of the microelectronic package substrate 400 are respectively configured so that they interface with each other in an uninterrupted manner around the periphery of the sub-assembly 500 in a plane parallel to the x-y plane, when the sub-assembly 300 is positioned on the microelectronic package substrate 400. In some embodiments, the metal layer 160 of the photonic fanout die 100 and the metal pad 410 of the microelectronic package substrate 400 are connected together in a fixed manner, such as by soldering or another technique. In various embodiments, the microelectronic package substrate 400 can be formed of Bismaleimide-Triazine resin or polyimide-based composites, or glass, among others. Also, in various embodiments, the microelectronic package substrate 400 includes conductive routings formed through one or more vertical layers of routings that are interconnected as needed using conductive via structures.

In some embodiments, the photonic fanout die 100 can be mounted onto the microelectronic package substrate 400 prior to attaching any other die, e.g., prior to attaching the photonic die 200 and/or the other die 250. Then, the assembly can be "yielded" (e.g., Known Good Substrate) prior to attaching the other die, e.g., prior to attaching the photonic die 200 and/or the other die 250. For example, the test and characterization optical waveguide 150 can be used to evaluate and yield either the photonic fanout die 100 by itself or the assembly of the photonic fanout die 100 with the microelectronic package substrate 400. This approach of testing and yielding the photonic components of the photonic fanout die 100 prior to attachment of additional die within the opening 110 can improve/reduce the overall cost of the assembly.

Figure 6A:
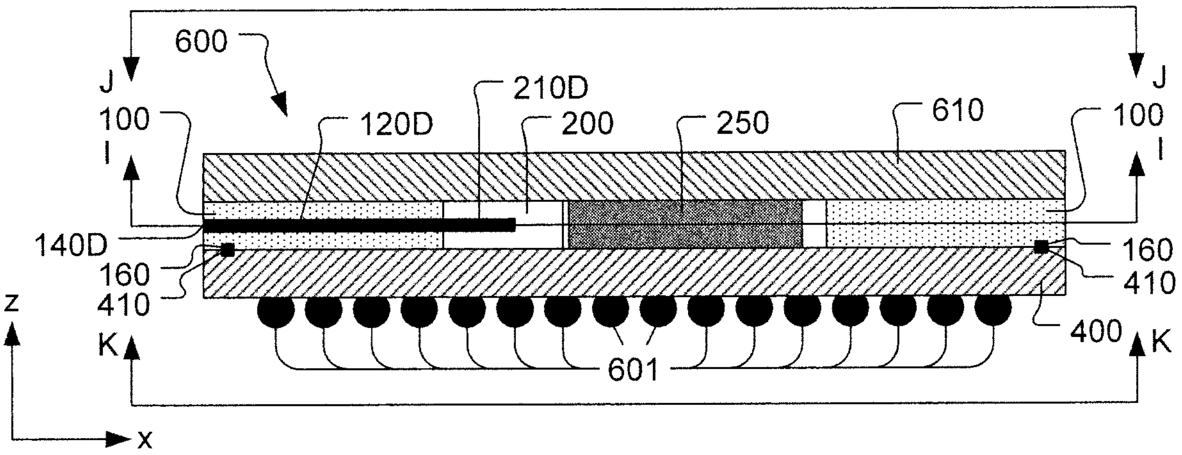
FIG. 6A shows a vertical cross-section view through an assembly that includes a lid positioned on the sub-assembly, in accordance with some embodiments.
Figure 6B:
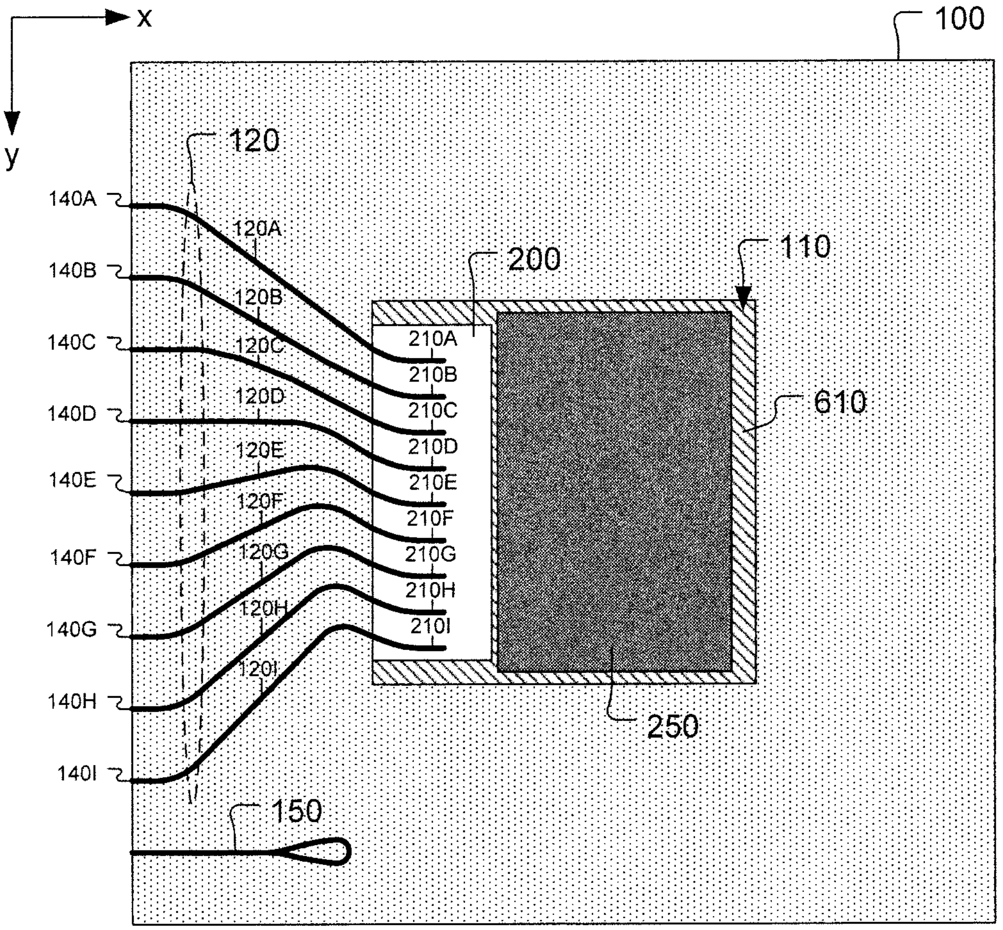
FIG. 6B shows a horizontal cross-section view at the level of the optical waveguides looking toward the lid, referenced as View I-I in FIG. 6A, in accordance with some embodiments.
Figure 6C:
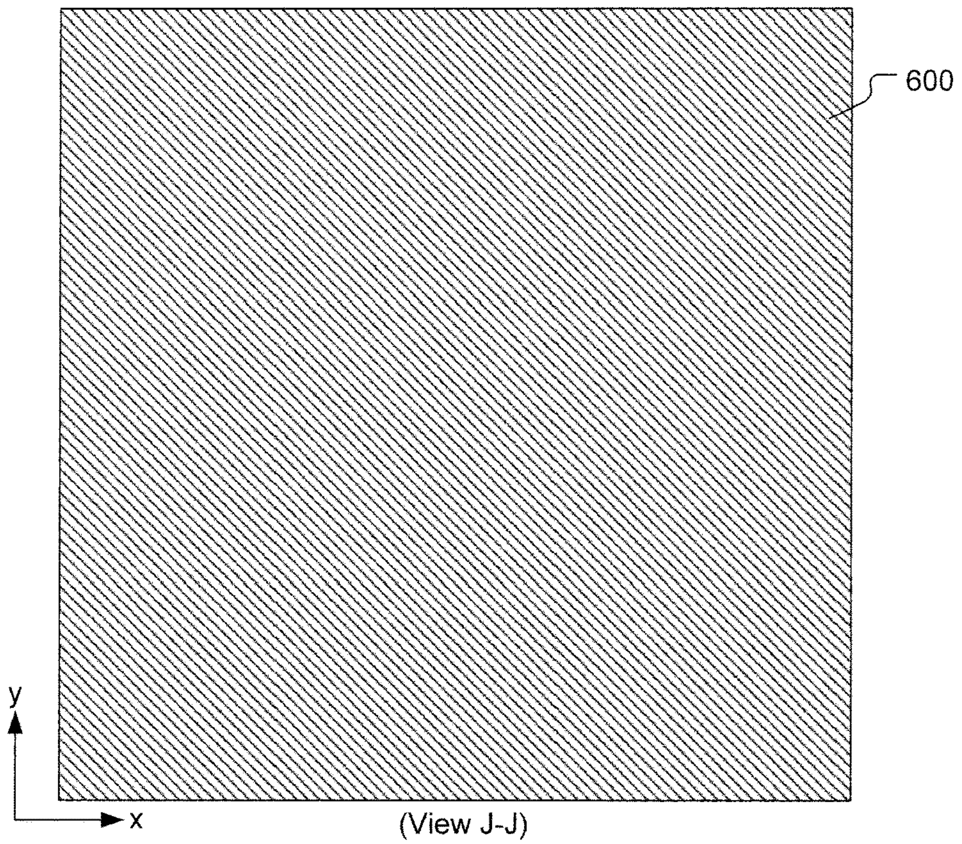
FIG. 6C shows a top view of the assembly, referenced as View J-J in FIG. 6A, in accordance with some embodiments.
Figure 6D:
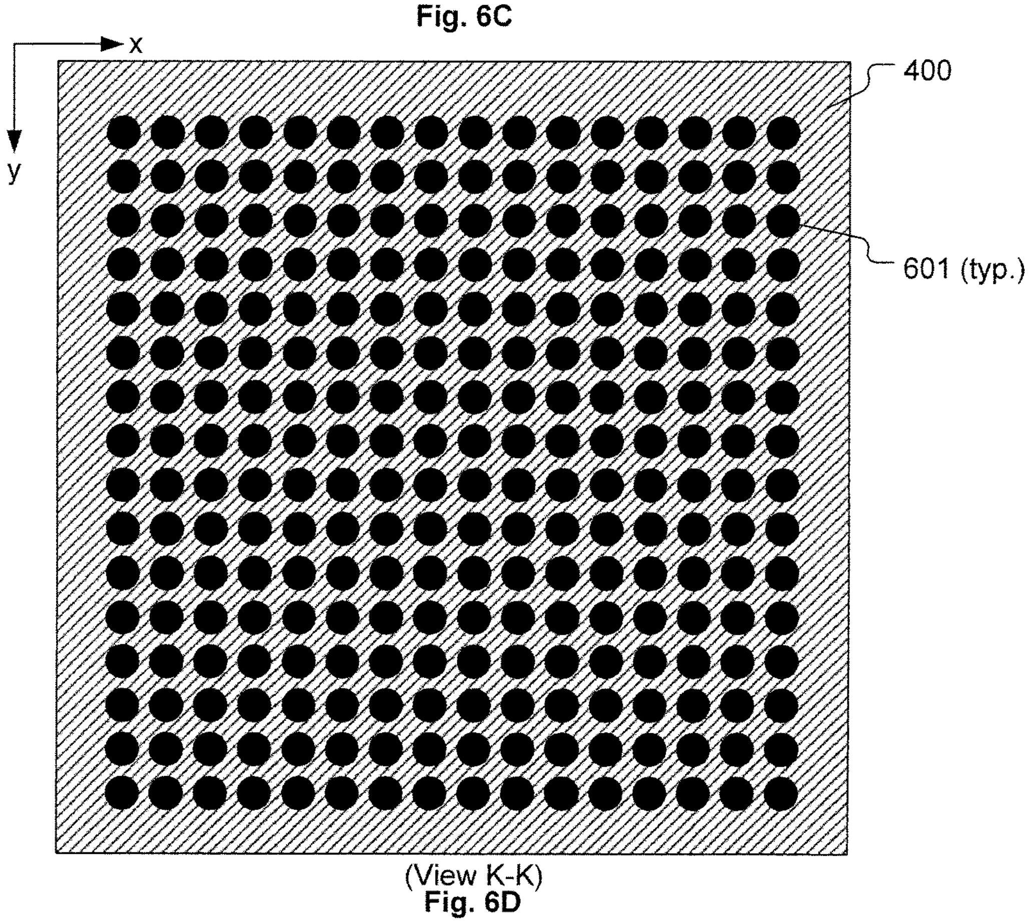
FIG. 6D shows a bottom view of the assembly, referenced as View K-K in FIG. 6A, in accordance with some embodiments.

FIG. 6A shows a vertical cross-section view through an assembly 600 that includes a lid 610 positioned on the sub-assembly 500, in accordance with some embodiments. The vertical cross-section view of FIG. 6A corresponds the vertical cross-section view of FIG. 5B, which is referenced as View H-H in FIG. 5A. FIG. 6B shows a horizontal cross-section view at the level of the optical waveguides 120 looking toward the lid 610, referenced as View I-I in FIG. 6A, in accordance with some embodiments. FIG. 6C shows a top view of the assembly 600, referenced as View J-J in FIG. 6A, in accordance with some embodiments. FIG. 6D shows a bottom view of the assembly 600, referenced as View K-K in FIG. 6A, in accordance with some embodiments. In some embodiments, the lid 610 is attached to the top surface 105 of the photonic fanout die 100. In various embodiments, the lid 610 can be formed of Invar, Kovar, aluminum, or copper, among others. In some embodiments, the lid 610 is plated with nickel, gold, or palladium, among others. In some embodiments, where the photonic fanout die 100, the lid 610, and the microelectronic package substrate 400 are all semiconductors, ceramics, metals, or glass, the entire assembly 600 of FIGS. 6A-6D can be effectively hermetic, which can dramatically simplify the qualification of the photonic elements within the assembly.

FIG. 6A also shows that in some embodiments the microelectronic package substrate 400 can include a ball grid array (BGA) 601 disposed on the exterior surface, e.g., on the surface opposite of the sub-assembly 300. Also, in some embodiments, the microelectronic package substrate 400 can be configured to support a pin grid array (PGA) or a land grid array (LGA), or other type of electronic connection. It should be understood that the BGA 601 as shown in FIG. 6D is provided by way of example. In various embodiments, the BGA 601 can be configured in manner different than what is shown in the example of FIG. 6D. It should be understood that the BGA, PGA, LGA, or other type of electronic connection implemented within the microelectronic package substrate 400 can be configured as needed to facilitate electrical connection between the microelectronic package substrate 400 and another device.

Figure 7A:
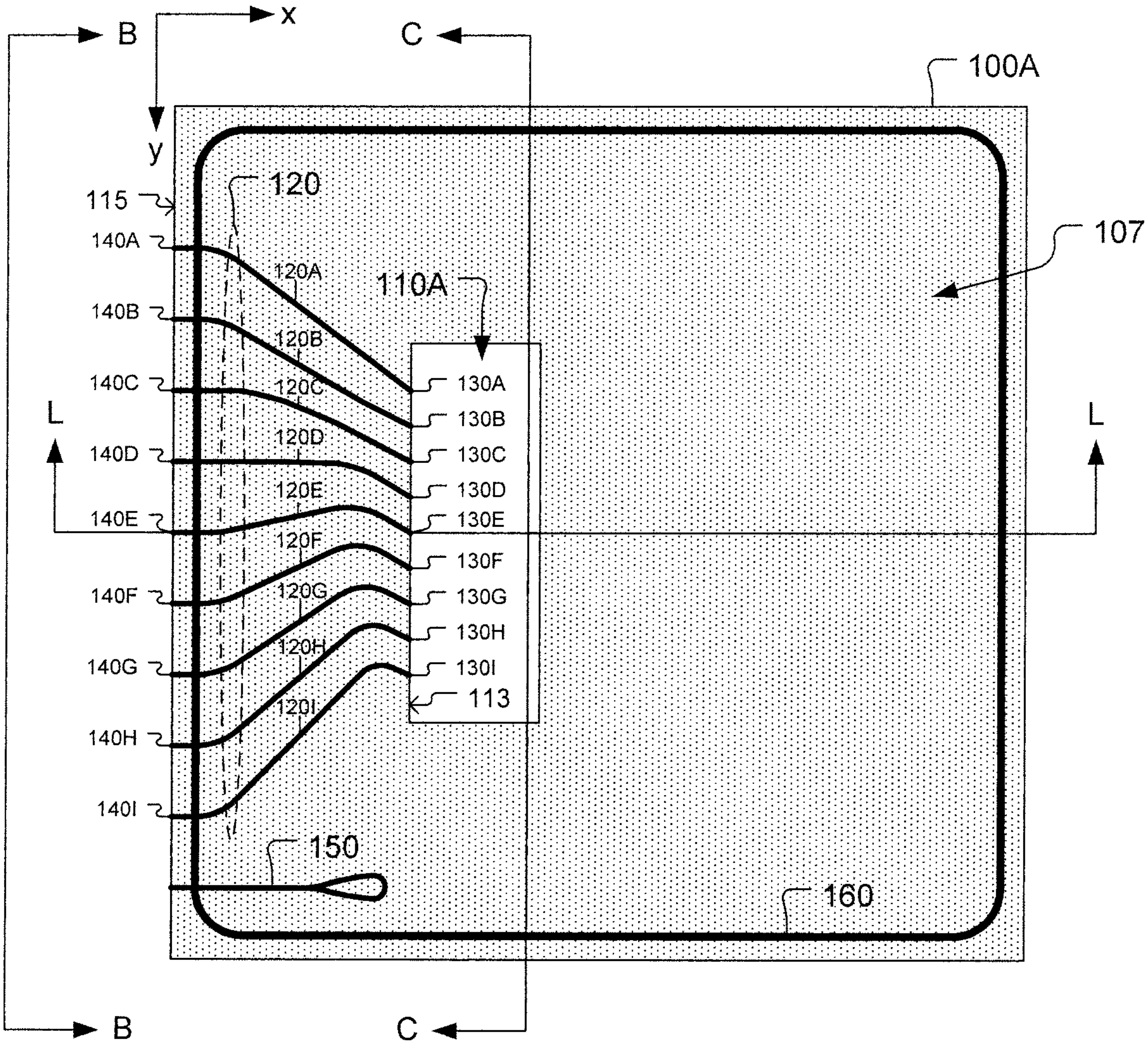
FIG. 7A shows a bottom view of a photonic fanout die, in accordance with some embodiments.
Figure 7B:
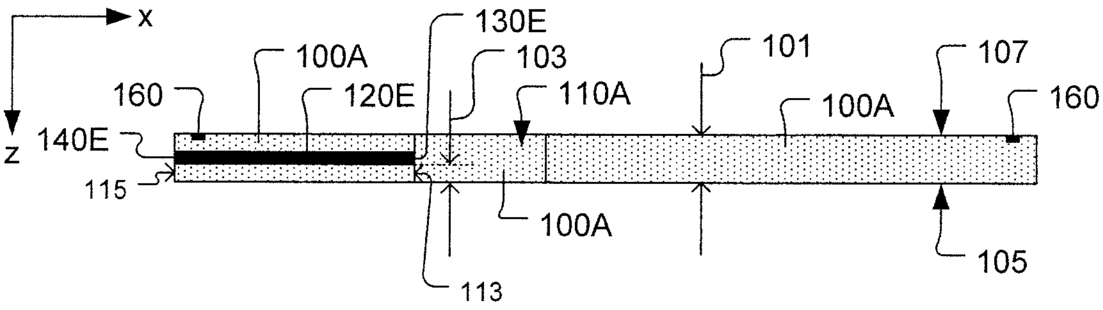
FIG. 7B shows a vertical cross-section view through the photonic fanout die, referenced as View L-L in FIG. 7A, in accordance with some embodiments.

FIG. 7A shows a bottom view of a photonic fanout die 100A, in accordance with some embodiments. The photonic fanout die 100A is a variation of the photonic fanout die 100. Specifically, relative to the photonic fanout die 100, the photonic fanout die 100A has an opening 110A that is shaped and sized to accept just the photonic die 200. Other than the size and shape of the opening 110A, the other features of like reference numeral of the photonic fanout die 100A are the same as described above with regard to the photonic fanout die 100. FIG. 7B shows a vertical cross-section view through the photonic fanout die 100A, referenced as View L-L in FIG. 7A, in accordance with some embodiments.

Figure 8A:
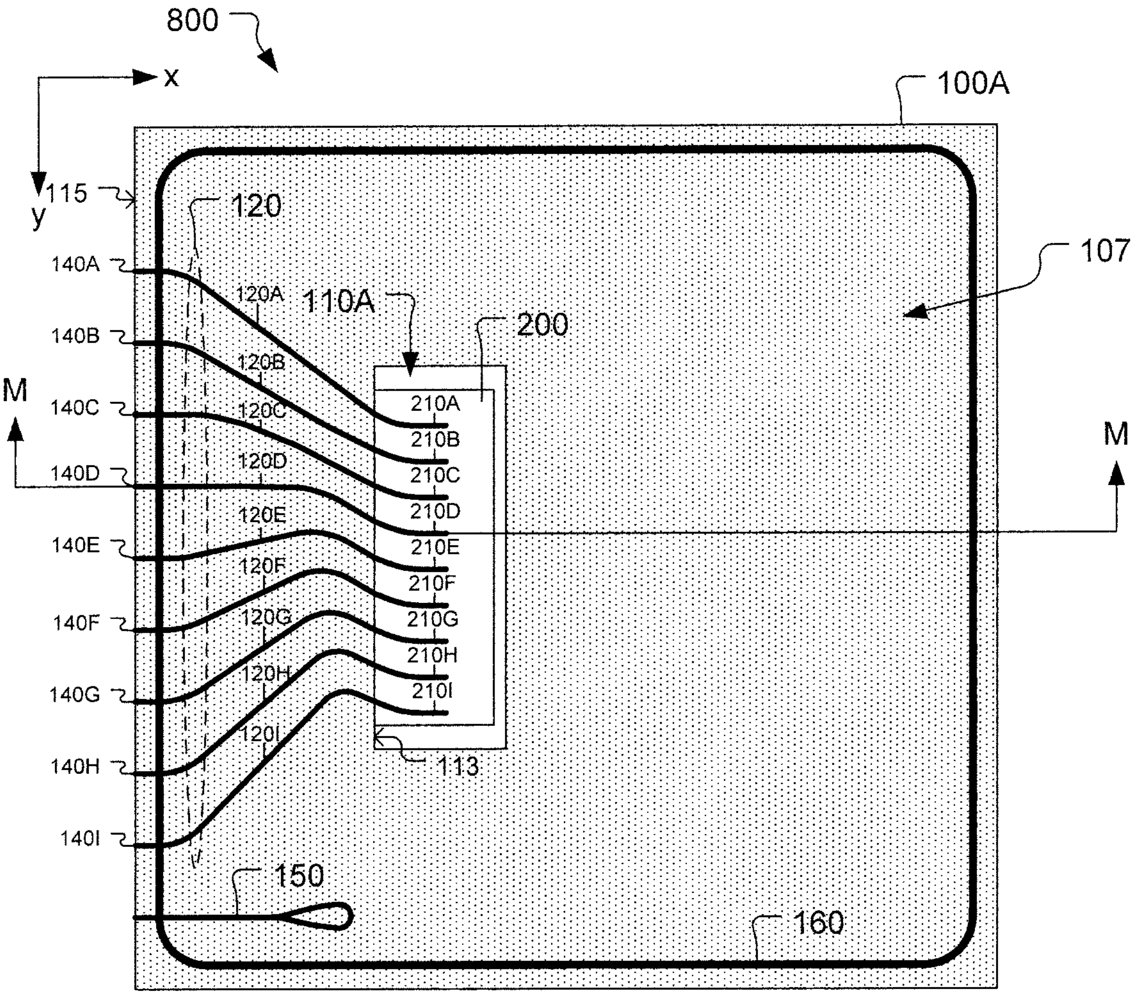
FIG. 8A shows a bottom view of a sub-assembly that includes the photonic die positioned within the opening of the photonic fanout die, in accordance with some embodiments.
Figure 8B:
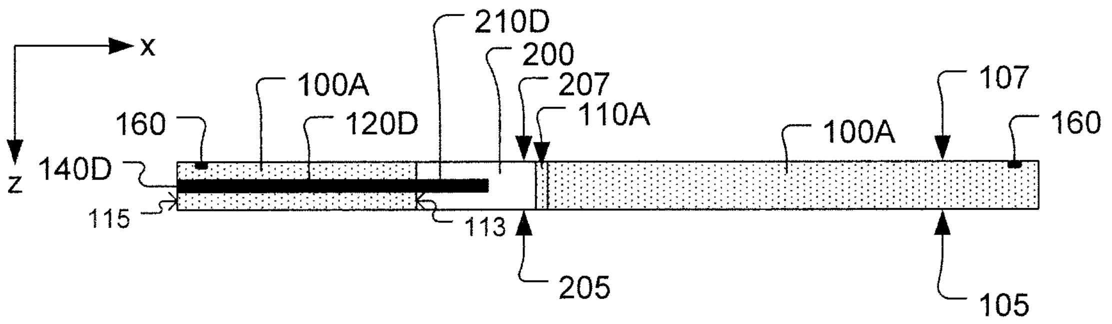
FIG. 8B shows a vertical cross-section view through the sub-assembly, referenced as View M-M in FIG. 8A, in accordance with some embodiments.

FIG. 8A shows a bottom view of a sub-assembly 800 that includes the photonic die 200 positioned within the opening 110A of the photonic fanout die 100A, in accordance with some embodiments. FIG. 8B shows a vertical cross-section view through the sub-assembly 800, referenced as View M-M in FIG. 8A, in accordance with some embodiments. The sub-assembly 800 shows relative positions of electrical and optical components. For example, in the sub-assembly 800, the photonic die 200 is positioned within the opening 110A so that the optical waveguides 210A-210I within the photonic die 200 are optically aligned with the optical waveguides 120A-120I, respectively, within the photonic fanout die 100A, and more specifically with the spot size converters 130A-130I, respectively, when present within the photonic fanout die 100A. The example embodiment of FIG. 8A shows the one photonic die 200 positioned within the opening 110A and interfaced with the photonic fanout die 100A. However, it should be understood that in other embodiments multiple photonic die (having configurations similar to the photonic die 200) can be positioned within the opening 110A to interface with the photonic fanout die 100A.

Figure 9A:
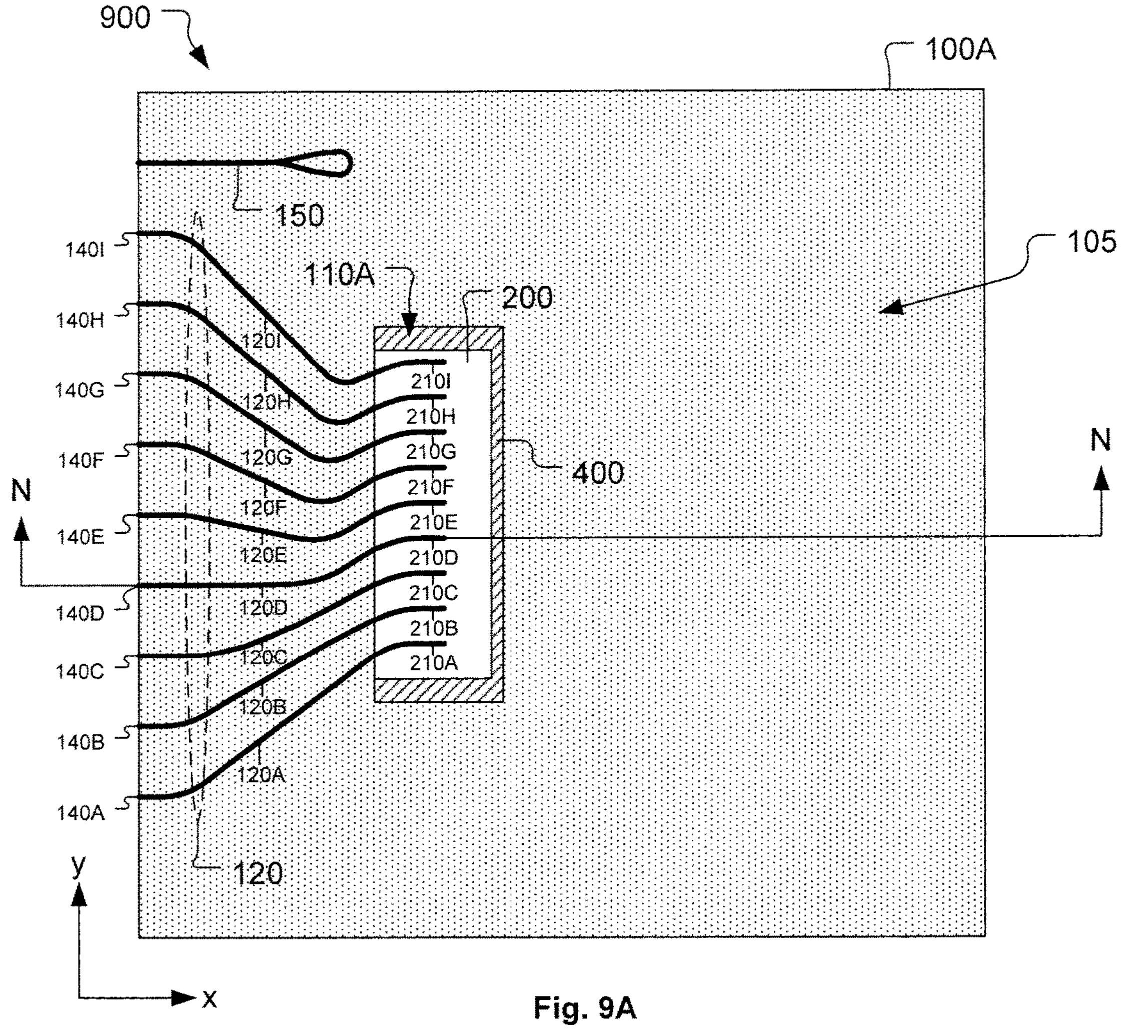
FIG. 9A shows a top view of a sub-assembly that includes the sub-assembly positioned on the microelectronic package substrate, in accordance with some embodiments.
Figure 9B:
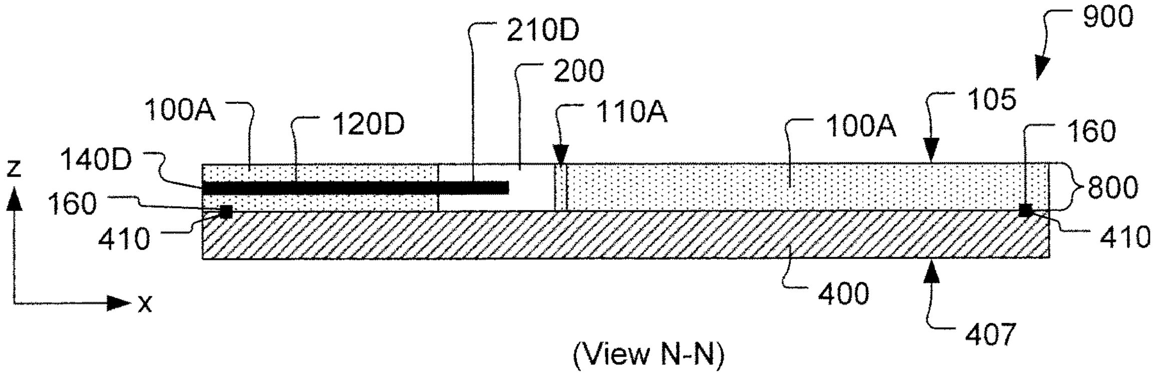
FIG. 9B shows a vertical cross-section view through the sub-assembly, referenced as View N-N in FIG. 9A, in accordance with some embodiments.

FIG. 9A shows a top view of a sub-assembly 900 that includes the sub-assembly 800 positioned on the microelectronic package substrate 400, in accordance with some embodiments. More specifically, in the sub-assembly 900, the sub-assembly 800 is positioned on the microelectronic package substrate 400 such that the bottom surface 107 of the photonic fanout die 100A is positioned facing toward the top surface 405 of the microelectronic package substrate 400. FIG. 9B shows a vertical cross-section view through the sub-assembly 900, referenced as View N-N in FIG. 9A, in accordance with some embodiments. In some embodiments, the metal layer 160 of the photonic fanout die 100A and the metal pad 410 of the microelectronic package substrate 400 are respectively configured so that they interface with each other in an uninterrupted manner around the periphery of the sub-assembly 900 in a plane parallel to the x-y plane, when the sub-assembly 800 is positioned on the microelectronic package substrate 400. In some embodiments, the metal layer 160 of the photonic fanout die 100A and the metal pad 410 of the microelectronic package substrate 400 are connected together in a fixed manner within the assembly 900, such as by soldering or another technique.

Figure 10A:
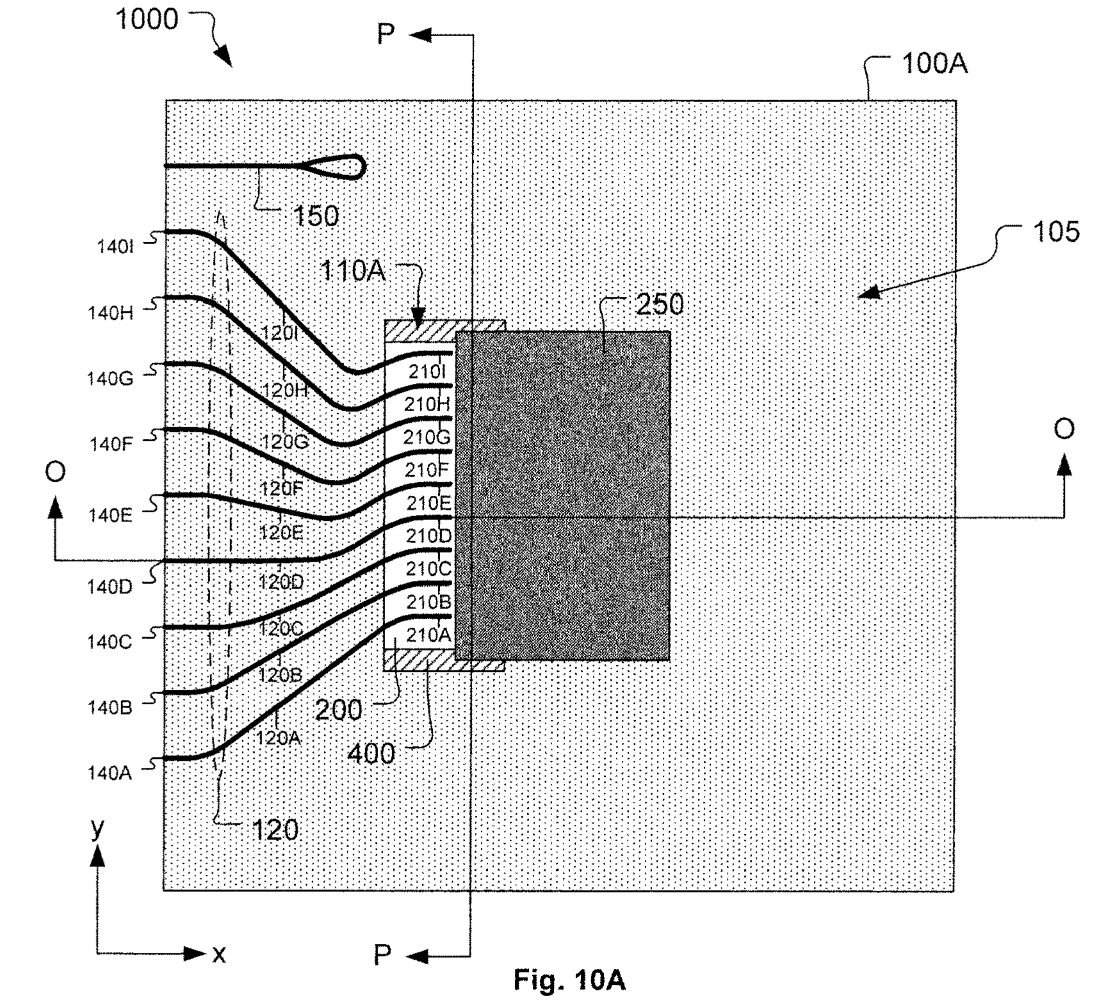
FIG. 10A shows a top view of an assembly that includes the die positioned on top of the sub-assembly, in accordance with some embodiments.
Figure 10B:
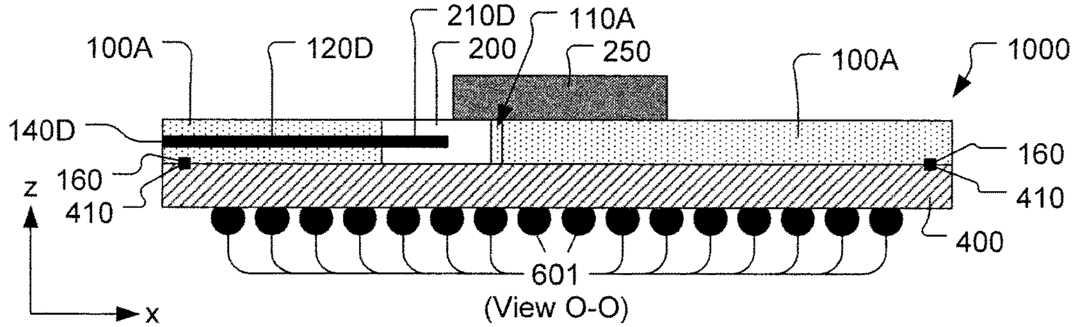
FIG. 10B shows a vertical cross-section view through the assembly, referenced as View O-O in FIG. 10A, in accordance with some embodiments.
Figure 10C:
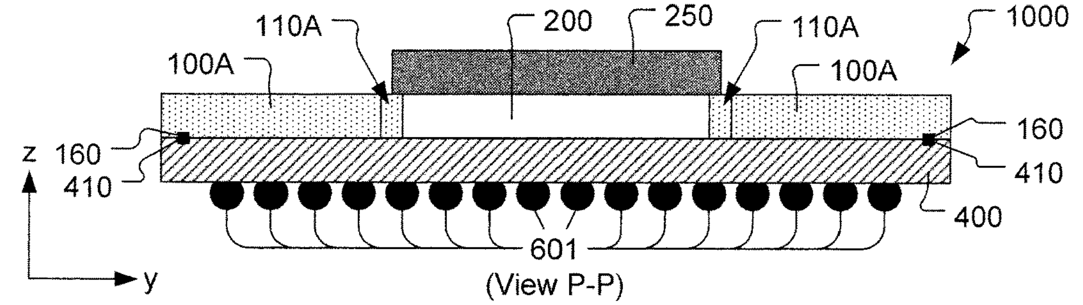
FIG. 10C shows a vertical cross-section view through the assembly in a plane parallel to the y-z plane, referenced as View P-P in FIG. 10A, in accordance with some embodiments.

FIG. 10A shows a top view of an assembly 1000 that includes the die 250 positioned on top of the sub-assembly 900, in accordance with some embodiments. FIG. 10B shows a vertical cross-section view through the assembly 1000, referenced as View O-O in FIG. 10A, in accordance with some embodiments. FIG. 10C shows a vertical cross-section view through the assembly 1000 in a plane parallel to the y-z plane, referenced as View P-P in FIG. 10A, in accordance with some embodiments. In some embodiments, the die 250 is mounted directly to the photonic die 200 and is electrically connected to the photonic die 200. In various embodiments, the electrical connections between the die 250 and the photonic die 200 can be BGA, micro-bumps, through-silicon-vias, through-glass-vias, wirebonds, among others. As shown in FIGS. 10A-10C, by way of example, the shape and size of the opening 110A within the photonic fanout die 100A is configured to circumscribe the photonic die 200, such that the top surface 105 of the photonic fanout die 100A provides a base upon which the die 250 can be disposed and supported. In some embodiments, the photonic die 200 is embedded into the microelectronic package substrate 400. In these embodiments, the photonic die 200 can be electrically connected in a vertical manner to another die, such as to the die 250.

Figure 11A:
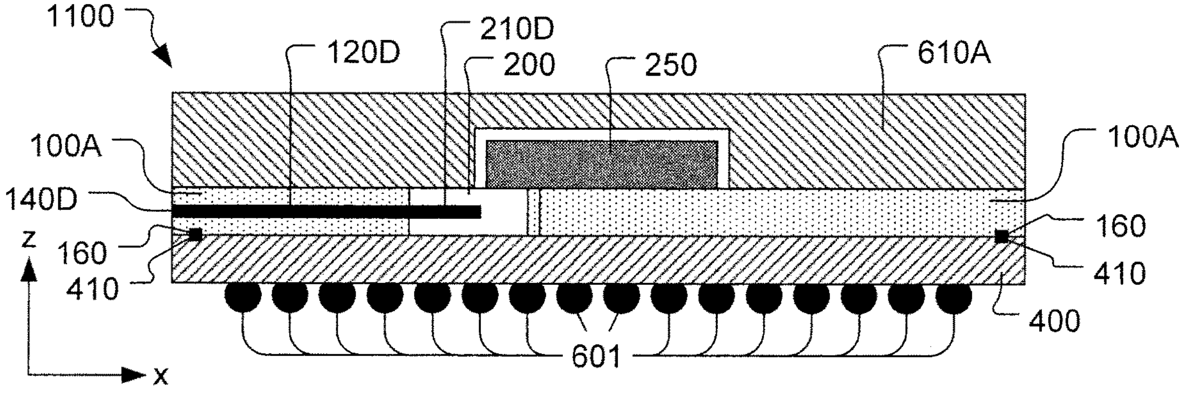
FIG. 11A shows a vertical cross-section view through an assembly that includes a lid positioned on the assembly, in accordance with some embodiments.
Figure 11B:
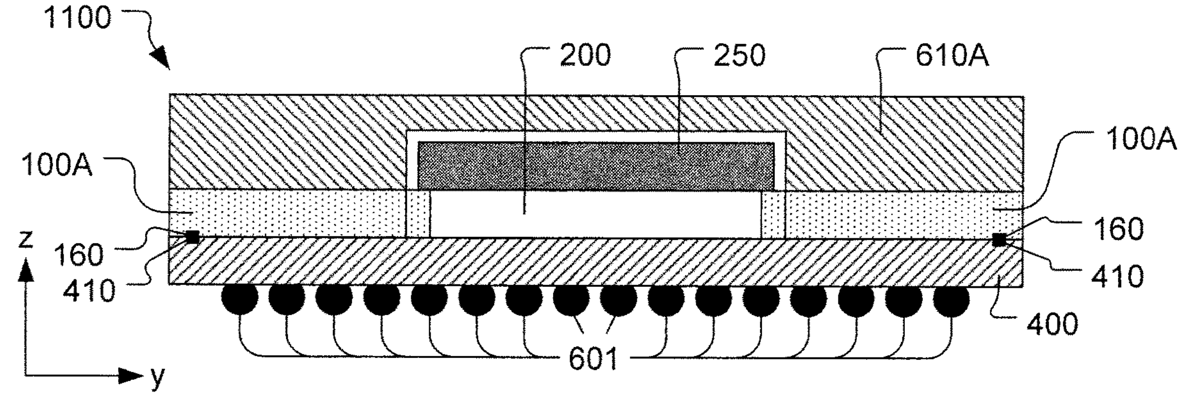
FIG. 11B shows a vertical cross-section view through the assembly that includes the lid positioned on the assembly, in accordance with some embodiments.

FIG. 11A shows a vertical cross-section view through an assembly 1100 that includes a lid 610A positioned on the assembly 1000, in accordance with some embodiments. The vertical cross-section view of FIG. 11A corresponds the vertical cross-section view of FIG. 10B, which is referenced as View O-O in FIG. 10A. FIG. 11B shows a vertical cross-section view through the assembly 1100 that includes the lid 610A positioned on the assembly 1000, in accordance with some embodiments. The vertical cross-section view of FIG. 11B corresponds the vertical cross-section view of FIG.

10C, which is referenced as View P-P in FIG. 10A. In various embodiments, the lid 610A is configured to include a cavity within which the die 250 is received when the lid 610A is positioned on the photonic fanout die 100A. In some embodiments, the lid 610A is attached to the top surface 105 of the photonic fanout die 100A. In various embodiments, the lid 610A can be formed of Invar, Kovar, aluminum, or copper, among others. In some embodiments, the lid 610A is plated with nickel, gold, or palladium, among others. In some embodiments, where the photonic fanout die 100A, the lid 610A, and the microelectronic package substrate 400 are all semiconductors, ceramics, metals, or glass, the entire assembly 1100 can be effectively hermetic, which can dramatically simplify the qualification of the photonic elements within the assembly.

Figure 12:
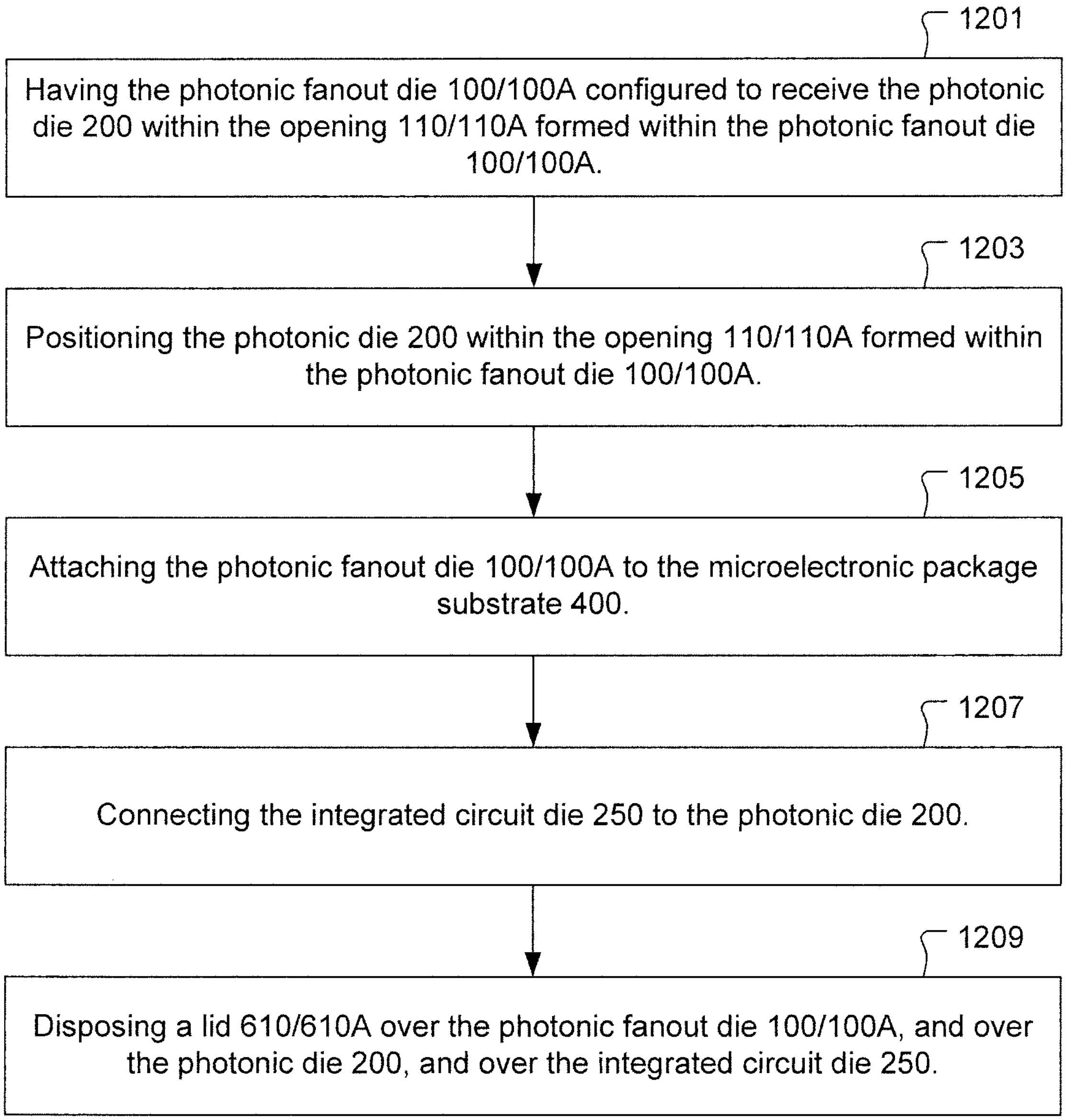
FIG. 12 shows a flowchart of a method for packaging the photonic die, in accordance with some embodiments.

FIG. 12 shows a flowchart of a method for packaging the photonic die 200, in accordance with some embodiments. The method includes an operation 1201 for having the photonic fanout die 100/100A configured to receive the photonic die 200 within the opening 110/110A formed within the photonic fanout die 100/100A. The method also includes an operation 1203 for positioning the photonic die 200 within the opening 110/110A formed within the photonic fanout die 100/100A. The operation 1203 is performed so that the optical waveguides 210A-210I within the photonic die 200 optically align with the optical waveguides 120A-120I, respectively, within the photonic fanout die 100/100A. The method also includes an operation 1205 for attaching the photonic fanout die 100/100A to the microelectronic package substrate 400. In some embodiments, the operation 1205 is performed such that the photonic fanout die 100/100A and the microelectronic package substrate 400 are hermetically sealed together. In some embodiments, the operation 1203 is performed before the operation 1205. However, in some embodiments, the operation 1205 is performed before the operation 1203. The method also includes an operation 1207 for connecting the integrated circuit die 250 to the photonic die 200. In some embodiments, the operation 1207 is performed before the operation 1205. However, in some embodiments, the operation 1205 is performed before the operation 1207. The method further includes an operation 1209 for disposing a lid 610/610A over the photonic fanout die 100/100A, and over the photonic die 200, and over the integrated circuit die 250. In some embodiments, the operation 1209 is performed such that the lid 610/610A and the photonic fanout die 100/100A are hermetically sealed together.

In some embodiments, a photonic fanout die 100/100A is disclosed. The photonic fanout die 100/100A includes a planar structure (body of photonic fanout die 100/100A) having a top surface 105, a bottom surface 107, and outer side surfaces extending between the top surface 105 and the bottom surface 107 around an outer perimeter of the planar structure. In various embodiments, the planar structure is a silicon interposer, a glass interposer, a portion of a semiconductor wafer, or a portion of a panel. In some embodiments, the planar structure has a substantially uniform thickness 101 as measured perpendicularly between the top surface 105 and the bottom surface 107. The planar structure includes an opening 110/110A formed within the outer perimeter. In some embodiments, the opening 110/110A has a shape and a size configured to receive a photonic die 200 within the opening 110/110A. The opening 110/110A has side surfaces that extend from the top surface to the bottom surface of the planar structure.

The photonic fanout die 100/100A also includes a plurality of optical waveguides 120A-120I formed within the planar structure to extend from a side surface 113 of the opening 110/110A to an outer side surface 115 of the planar structure. In some embodiments, the plurality of optical waveguides 120A-120I are formed at a prescribed depth 103 within the planar structure. In some embodiments, the prescribed depth 103 within the planar structure is set to provide for optical alignment between the ends of the plurality of optical waveguides 120A-120I at the side surface 113 of the opening 110/110A and corresponding optical waveguides 210A-210I within the photonic die 200, when the photonic die 200 is positioned within the opening 110/110A. The plurality of optical waveguides 120A-120I is configured such that a spacing 109 between adjacent optical waveguides 120A-120I at the outer side surface 115 of the planar structure is greater than a spacing 111 between adjacent optical waveguides 120A-120I at the side surface 113 of the opening 110/110A. In some embodiments, the plurality of optical waveguides 120A-120I is formed of one or more of silicon, silicon nitride, doped silicon dioxide, and silicon dioxide optical waveguides formed via femtosecond laser direct-write (FLDW) technology, among others. In some embodiments, one or more of the plurality of optical waveguides 120A-120I has a light propagation axis oriented at a non-perpendicular angle $\alpha$ relative to the side surface 113 of the opening 110/110A. In some embodiments, the non-perpendicular angle $\alpha$ is within a range extending from about 0 degree to about 8 degrees.

In some embodiments, the photonic fanout die 100/100A includes a plurality of spot size converters 130A-130I respective formed at the ends of the plurality of optical waveguides 120A-120I at the side surface 113 of the opening 110/110A. In some embodiments, the photonic fanout die 100/100A includes a first plurality of spot size converters 130A-130I respective formed at the ends of the plurality of optical waveguides 120A-120I at the side surface 113 of the opening 110/110A, and a second plurality of spot size converters 140A-140I respective formed at the ends of the plurality of optical waveguides 120A-120I at the outer side surface 115 of the planar structure.

In some embodiments, the photonic fanout die 100/100A includes photonic devices formed within the planar structure, where the photonic devices include one or more of polarization splitter rotators, optical spot size converters, star optical couplers, arrayed optical waveguides, optical modulators, photodetectors, and optical phase shifters. In some embodiments, the photonic fanout die 100/100A includes metal routing formed within the planar structure. Also, in some embodiments, the photonic fanout die 100/100A includes through-silicon-vias or through-glass-vias formed within the planar structure and connected to the metal routing.

In some embodiments, the photonic fanout die 100/100A includes a test and characterization optical waveguide 150 formed within the planar structure to extend into the planar structure from the outer side surface 115 of the planar structure. In some embodiments, the test and characterization optical waveguide 150 includes a reflector. In some embodiments, the test and characterization optical waveguide 150 is configured to loop back to another optical waveguide that is exposed at the outer side surface of the planar structure. Also, in some embodiments, the photonic fanout die 100/100A includes a metal layer 160 configured to extend around the planar structure near the outer perimeter of the planar structure. The metal layer 160 is exposed at the bottom surface 107 of the planar structure.

In some embodiments, a photonic package assembly is disclosed. The photonic package assembly includes a microelectronic package substrate 400 having a top surface 405 and a bottom surface 407. In some embodiments, the microelectronic package substrate 400 is one or more of a silicon interposer, an organic substrate, a ceramic substrate, a glass interposer, and an embedded multi-die interconnect bridge. In some embodiments, the microelectronic package substrate 400 has a substantially uniform thickness 401 as measured perpendicularly between the top and bottom surfaces (405 and 407) of the microelectronic package substrate 400. In some embodiments, one or more of a ball grid array, pin grid array, and a land grid array is formed on the bottom surface of the microelectronic package substrate 400.

The photonic package assembly also includes a photonic fanout die 100/100A having a top surface 105 and a bottom surface 107. The photonic fanout die 100/100A is disposed on the microelectronic package substrate 400 such that the bottom surface 107 of the photonic fanout die 100/100A faces toward the top surface 405 of the microelectronic package substrate 400. The photonic fanout die 100/100A has outer side surfaces extending between the top and bottom surfaces (105 and 107) of the photonic fanout die 100/100A around an outer perimeter of the photonic fanout die 100/100A. The photonic fanout die 100/100A includes an opening 110/110A formed within the outer perimeter. The opening 110/110A has side surfaces that extend between the top and bottom surfaces (105 and 107) of the photonic fanout die 100/100A. The photonic fanout die 100/100A includes a plurality of optical waveguides 120A-120I formed to extend from a side surface 113 of the opening 110/110A to an outer side surface 115 of the photonic fanout die 100/100A. The plurality of optical waveguides 120A-120I is configured such that a spacing 109 between adjacent optical waveguides 120A-120I at the outer side surface 115 of the photonic fanout die 100/100A is greater than a spacing 111 between adjacent optical waveguides 120A-120I at the side surface 113 of the opening 110/110A within the photonic fanout die 100/100A. In some embodiments, the photonic fanout die 100/100A includes a metal layer 160 exposed at the bottom surface of the photonic fanout die 100/100A near the outer perimeter of the photonic fanout die 100/100A, and the microelectronic package substrate 400 includes a metal pad 410 configured to connect with the metal layer 160 of the photonic fanout die 100/100A.

The photonic package assembly also includes a photonic die 200 positioned within the opening 110/110A of the photonic fanout die 100/100A, such that a plurality of optical waveguides 210A-210I within the photonic die 200 optically align with the plurality of optical waveguides 120A-120I within the photonic fanout die 100/100A at the side surface 113 of the opening 110/110A within the photonic fanout die 100/100A. The photonic package assembly also includes an integrated circuit die 250 positioned to electrically interface with the photonic die 200.

In some embodiments, the integrated circuit die 250 is positioned within the opening 110 formed within photonic fanout die 100. In some embodiments, a lid structure 610 is disposed over the photonic fanout die 100 and over both the photonic die 200 and the integrated circuit die 250 within the opening 110 of the photonic fanout die 100. In some embodiments, the lid structure 610 has a top surface and a bottom surface and a substantially uniform thickness as measured perpendicularly between the top and bottom surfaces. In some embodiments, the lid structure 610 is hermetically sealed to the photonic fanout die 100, and the photonic fanout die 100 is hermetically sealed to the microelectronic package substrate 400.

In some embodiments, the integrated circuit die 250 is positioned over both a portion of the photonic die 200 and a portion of the top surface 105 of the photonic fanout die 100A. In some embodiments, a lid structure 610A is disposed over the photonic fanout die 100A, and over the photonic die 200 within the opening 110A of the photonic fanout die 100A, and over the integrated circuit die 250. In some embodiments, the lid structure 610A has a top surface and a bottom surface, where the bottom surface of the lid structure 610A includes a cavity formed to receive the integrated circuit die 250 when the lid structure 610A is disposed on the photonic fanout die 100A. In some embodiments, the lid structure 610A is hermetically sealed to the photonic fanout die 100A, and the photonic fanout die 100A is hermetically sealed to the microelectronic package substrate 400.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the described embodiments.

What is claimed is:

1. A photonic assembly, comprising:

a substrate;

a single planar structure disposed on the substrate, the single planar structure having a top surface, a bottom surface, and outer side surfaces extending between the top surface and the bottom surface around an outer perimeter of the single planar structure, wherein the single planar structure has a substantially uniform thickness as measured perpendicularly between the top surface and the bottom surface, the single planar structure including an opening formed within the outer perimeter, the opening having side surfaces that extend from the top surface to the bottom surface;

a photonic die disposed on the substrate within the opening of the single planar structure, the photonic die positioned next to a side surface of the opening;

a second die disposed on the substrate within the opening of the single planar structure, wherein the second die is an electronic component electrically connected to the photonic die, wherein the substantially uniform thickness of the single planar structure bounds both a thickness of the photonic die and a thickness of the second die;

a plurality of optical waveguides formed within the single planar structure to extend from the side surface of the opening next to the photonic die to an outer side surface of the single planar structure, each of the plurality of optical waveguides having a corresponding first end exposed at the side surface of the opening next to the photonic die and a corresponding second end exposed at the outer side surface of the single planar structure, the plurality of optical waveguides configured such that a spacing between adjacent optical waveguides at the outer side surface of the single planar structure is greater than a spacing between adjacent optical waveguides at the side surface of the opening to which the photonic die is in physical contact; and a lid disposed in contact with the top surface of the single planar structure, the lid configured to cover the opening of the single planar structure and enclose both the photonic die and the second die within the opening of the single planar structure.

2. The photonic assembly as recited in claim 1, wherein the photonic die includes a second plurality of optical waveguides respectively optically coupled to the plurality of optical waveguides formed within the single planar structure.

3. The photonic assembly as recited in claim 2, wherein the plurality of optical waveguides are formed at a prescribed depth within the single planar structure.

4. The photonic assembly as recited in claim 3, wherein the prescribed depth within the single planar structure is set to provide for optical alignment between the ends of the plurality of optical waveguides at the side surface of the opening and corresponding optical waveguides within the photonic die when the photonic die is positioned within the opening.

5. The photonic assembly as recited in claim 1, wherein the plurality of optical waveguides is formed of one or more of silicon, silicon nitride, doped silicon dioxide, and silicon dioxide formed via femtosecond laser direct-write technology.

6. The photonic assembly as recited in claim 1, further comprising:

a plurality of spot size converters respectively formed at the ends of the plurality of optical waveguides at the side surface of the opening next to the photonic die.

7. The photonic assembly as recited in claim 1, further comprising:

a first plurality of spot size converters respectively formed at the ends of the plurality of optical waveguides at the side surface of the opening next to the photonic die; and a second plurality of spot size converters respectively formed at the ends of the plurality of optical waveguides at the outer side surface of the single planar structure.

8. The photonic assembly as recited in claim 1, wherein the single planar structure is a silicon interposer, a glass interposer, a portion of a semiconductor wafer, or a portion of a panel.

9. The photonic assembly as recited in claim 1, further comprising:

photonic devices formed within the single planar structure, the photonic devices including one or more of polarization splitter rotators, optical spot size converters, star optical couplers, arrayed optical waveguides, optical modulators, photodetectors, and optical phase shifters.

10. The photonic assembly as recited in claim 1, further comprising:

metal routing formed within the single planar structure; and through-silicon-vias or through-glass-vias formed within the single planar structure and connected to the metal routing.

11. The photonic assembly as recited in claim 1, further comprising:

a test and characterization optical waveguide formed within the single planar structure to extend into the single planar structure from the outer side surface of the single planar structure.

12. The photonic assembly as recited in claim 11, wherein the test and characterization optical waveguide includes a reflector.

13. The photonic assembly as recited in claim 11, wherein the test and characterization optical waveguide is configured to loop back to another optical waveguide that is exposed at the outer side surface of the single planar structure.

14. The photonic assembly as recited in claim 1, further comprising:

a metal layer configured to extend around the single planar structure near the outer perimeter of the single planar structure, the metal layer exposed at the bottom surface of the single planar structure.

15. The photonic assembly as recited in claim 1, wherein the top surface of the single planar structure circumscribes the opening in the single planar structure.

16. The photonic assembly as recited in claim 1, wherein the side surfaces of the opening extend contiguously around the opening.

17. The photonic assembly as recited in claim 1, wherein the single planar structure extends contiguously around an entirety of a perimeter of the opening.

18. The photonic assembly as recited in claim 1, wherein the same non-zero angle is within a range extending from greater than zero up to about 12 degrees as measured in a horizontal plane oriented parallel to the top surface of the single planar structure between the side surface of the opening and the light propagation axis of a given one of the plurality of optical waveguides.

19. The photonic assembly as recited in claim 18, wherein the respective light propagation axis of each of the plurality of optical waveguides is oriented substantially perpendicular to the outer side surface of the single planar structure.

20. The photonic assembly as recited in claim 18, wherein each adjacently positioned pair of optical waveguides within the plurality of optical waveguides are separated from each other along the side surface of the opening by a substantially same horizontal spacing as measured within the horizontal plane along the side surface of the opening.

21. The photonic assembly as recited in claim 20, wherein the spacing between adjacent optical waveguides at the outer side surface of the single planar structure is substantially equal.

22. The photonic assembly as recited in claim 1, wherein each of the plurality of optical waveguides is formed to have a substantially rectangular vertical cross-section.

23. The photonic assembly as recited in claim 1, wherein each of the plurality of optical waveguides is formed to have a substantially polygonal vertical cross-section.

24. The photonic assembly as recited in claim 1, wherein each of the plurality of optical waveguides is formed to have a vertical cross-section that includes one or more non-linear sides.

25. The photonic assembly as recited in claim 1, wherein each of the plurality of optical waveguides is formed to have a lateral dimension within a range extending from about 80 nanometers to about 300 nanometers, wherein the lateral dimension of a given optical waveguide of the plurality of optical waveguides is measured perpendicular to a light propagation axis of the given optical waveguide and within a horizontal plane oriented parallel to the top surface of the single planar structure.

26. The photonic assembly as recited in claim 1, wherein a light propagation axis of each of the plurality of optical waveguides has at least one different radius of curvature within a horizontal plane oriented parallel to the top surface of the single planar structure.

27. The photonic assembly as recited in claim 1, wherein each of the plurality of optical waveguides has a respective light propagation axis oriented at a same non-zero angle relative to a normal vector of the side surface of the opening, and wherein a grouping of the second ends of the plurality of optical waveguides is substantially centered on a grouping of the first ends of the plurality of optical waveguides, such that at least two bends exists along a respective light propagation axis of each optical waveguide in at least one-half of the plurality of optical waveguides.

* * * * *